(12) United States Patent
Ichikawa

(10) Patent No.: US 7,204,964 B2
(45) Date of Patent: Apr. 17, 2007

(54) CO OXIDIZER

(75) Inventor: Yasushi Ichikawa, Yamato (JP)

(73) Assignee: Nissan Motor Co., Ltd., Kanagawa (JP)

( * ) Notice: Subject to any disclaimer, the term of this patent is extended or adjusted under 35 U.S.C. 154(b) by 453 days.

(21) Appl. No.: 10/379,796

(22) Filed: Mar. 6, 2003

(65) Prior Publication Data

US 2003/0182859 A1  Oct. 2, 2003

(30) Foreign Application Priority Data

Mar. 27, 2002 (JP) .............................. 2002-088037

(51) Int. Cl.
 *B01D 50/00* (2006.01)
(52) U.S. Cl. ...................... 422/177; 422/176
(58) Field of Classification Search ................ 422/171, 422/173, 176, 177, 220, 222
 See application file for complete search history.

(56) References Cited

FOREIGN PATENT DOCUMENTS

| DE | 3612218 | 8/1987 |
|---|---|---|
| EP | 0 872 444 | 9/1995 |
| EP | 833401 A2 * | 4/1998 |
| JP | 11-43305 | 2/1999 |
| JP | P2000-203801 A | 7/2000 |
| JP | 2000-323162 A | 11/2000 |
| JP | 2001-003811 A | 1/2001 |
| JP | P2001-2401 A | 1/2001 |
| JP | 2001-040376 A | 2/2001 |
| JP | P2001-120973 A | 5/2001 |
| JP | P2001-137676 A | 5/2001 |
| JP | 2001-173912 | 6/2001 |
| JP | 2002-531247 A | 9/2002 |

* cited by examiner

*Primary Examiner*—Glenn Caldarola
*Assistant Examiner*—Tom P. Duong
(74) *Attorney, Agent, or Firm*—McDermott Will & Emery LLP

(57) ABSTRACT

A fuel cell system is proposed which is provided with a CO oxidizer having a compact agitator executing uniform mixing. The fuel cell system is provided with a reformer (2) performing reformate reactions to produce a hydrogen-rich reformate gas containing CO, a CO oxidizer (1) reducing the CO concentration in the reformate gas produced in the reformer (2), and a fuel cell performing power generation using reformate gas with a reduced CO concentration from the CO oxidizer. The CO oxidizer is provided with a CO removal catalyst (6) promoting oxidizing of CO. An oxidizing agent inlet (5) and an agitator (4) are provided upstream of the CO removal catalyst (6). The oxidizing agent inlet (5) supplies oxidizing agent to the reformate gas and the agitator (4) has a plurality of curved passages (8) having at least two curves.

4 Claims, 19 Drawing Sheets

CO OXIDIZER

FIELD OF THE INVENTION

This invention relates to a fuel cell system. In particular, it relates to a CO oxidizer which removes carbon monoxide (CO) from a reformate gas which is uniformly mixed with air.

BACKGROUND OF THE INVENTION

A CO oxidizer for a fuel cell system must agitate a reformate gas including air to mix the air uniformly into the reformate gas in order to remove carbon monoxide efficiently from the reformate gas.

Known methods and devices for agitating a reformate gas including air are described below.

Tokkai 2001-2401 published by the Japanese Patent Office in 2001 discloses a CO oxidizer which has rotating wings or a fan downstream of the gas inlet section. The rotating wings are rotated as a result of reformate gas flow and agitate the reformate gas.

In Tokkai 2000-203801 published by the Japanese Patent Office in 2000, a plurality of pipes are disposed perpendicular to the gas flow in order to agitate the reformate gas. Oxygen is discharged from holes in the wall of the pipes.

In Tokkai 2001-137676 published by the Japanese Patent Office in 2001, a partition plate which impedes gas flow is disposed perpendicular to the flow of gas in order to mix air in the impeded flow of gas.

In Tokkai 2001-120973 published by the Japanese Patent Office in 2001, a plurality of plates are provided in order to agitate gas. The plates are twisted into a spiral shape and disposed along the direction of gas flow in a gas passage.

SUMMARY OF THE INVENTION

The above techniques have the following problems.

In the prior-art technique disclosed in Tokkai 2001-2401, the degree of mixture of gases will be insufficient when the speed of gas flow is low.

In the prior-art technique disclosed in Tokkai 2000-203801, mixing oxygen from the holes in a pipe disposed in the flow of gas will result in an insufficient level of uniformity.

In the prior-art technique disclosed in Tokkai 2001-137676, a large pressure drop will result because the partition plate occupies 80% of the cross-section area of the flow passage.

In the prior-art technique disclosed in Tokkai 2001-120973, a compact structure can not be realized as a result of the requirement for a plurality of twisted plates disposed along a direction of gas flow.

In each of the prior-art techniques above, the degree of agitation is insufficient, or the size of the structure is enlarged, resulting in a large pressure drop.

It is therefore an object of this invention to provide a CO oxidizer which is provided with an agitator allowing uniform agitation in a compact structure and which avoids large pressure loss.

In order to achieve above object, this invention provides a carbon monoxide (CO) oxidizer connected to a reformer performing reformate reactions to produce a reformate gas containing hydrogen and carbon monoxide, the CO oxidizer having a catalyst for promoting oxidizing of carbon monoxide to reduce a concentration of carbon monoxide in the reformate gas produced by the reformer.

The CO oxidizer comprises a main passage allowing flow of reformate gas supplied from the reformer to an agitator; an inlet disposed upstream of the catalyst and supplying oxidizing agent to the reformate gas; and the agitator for agitating the reformate gas from the main passage. The agitator comprises at least three members for impeding a main stream of reformate gas flowing through the main passage, adjacent members of said at least three members being disposed so that their cross sections projected in the direction of the main stream partially overlap and so that their cross sections projected in the direction perpendicular to the main stream flowing in the main passage partially overlap. A plurality of curved passages having at least two curves are formed downstream of the inlet and between said at least three members. The agitator divides the main stream flowing through the main passage into a plurality of substreams flowing through the curved passage.

The details as well as other features and advantages of this invention are set forth in the remainder of the specification and are shown in the accompanying drawings.

DESCRIPTION OF THE PREFERRED EMBODIMENTS

Figure 1:
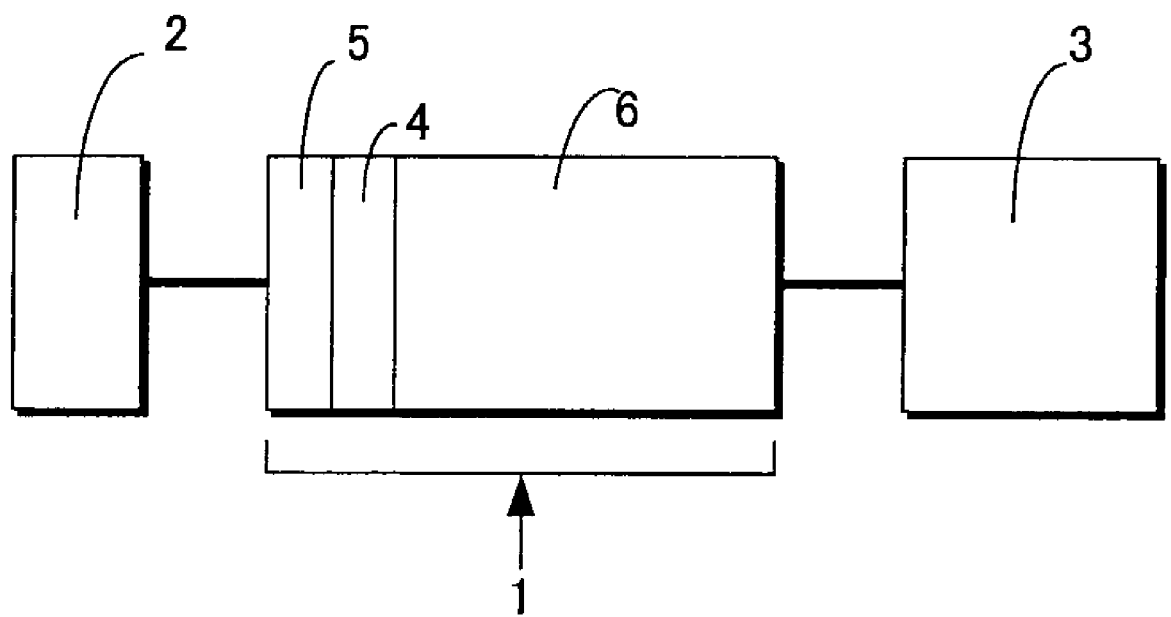
FIG. 1 is a schematic diagram showing the structure about a CO oxidizer in a fuel cell system according to a first to third embodiment.

FIG. 1 shows a fuel cell system according to the first embodiment in which reformate gas generated by a reformer 2 is supplied to a fuel cell 3.

In the reformer 2, a hydrogen-rich reformate gas is produced as a result of reforming reactions in a gaseous mixture of air or water and a hydrocarbon fuel. An example of a hydrocarbon fuel is gasoline. Carbon monoxide (CO) which is produced together with hydrogen by the reforming reactions constitutes a cause of deterioration of the fuel cell 3. Consequently a CO oxidizer 1 removes CO from the reformate gas. The CO oxidizer 1 is a CO oxidizing device which uses oxidizing reactions in order to reduce the concentration of CO and is disposed downstream of the reformer 2.

A CO removing catalyst 6 is provided inside the CO oxidizer 1 so as to promote oxidizing reactions for converting CO into carbon dioxide. An oxidizing agent inlet 5 is provided in the CO oxidizer 1 upstream of the CO removing catalyst 6 in order to introduce air from an air source (not shown) into the reformate gas. Thus, the gaseous oxidizing agent for supplying oxygen for use in oxidizing reactions is air in the embodiments. The CO concentration in the reformate gas discharged from the reformer 2 is approximately 1.5%. However the CO oxidizer 1 reduces the CO concentration to less than 10 ppm in order to allow efficient power generation by the fuel cell 3.

A uniform mixture of air and reformate gas containing CO is required in order to oxidize and remove CO efficiently in the CO oxidizer 1. For this purpose, an agitator 4 is provided between the oxidizing agent inlet 5 and the CO removal catalyst 6 in order to create a uniform mixture of air and reformate gas. In this manner, it is possible to prevent CO from passing through the CO oxidizer 1 and being supplied to the fuel cell 3 in an non-oxidized state. The CO oxidizer 1 is provided with an agitator 4, an oxidizing agent inlet 5 and a CO removal catalyst 6.

Next referring to FIG. 2 and FIG. 3, the structure of the agitator 4 according to this embodiment will be described.

Figure 2:
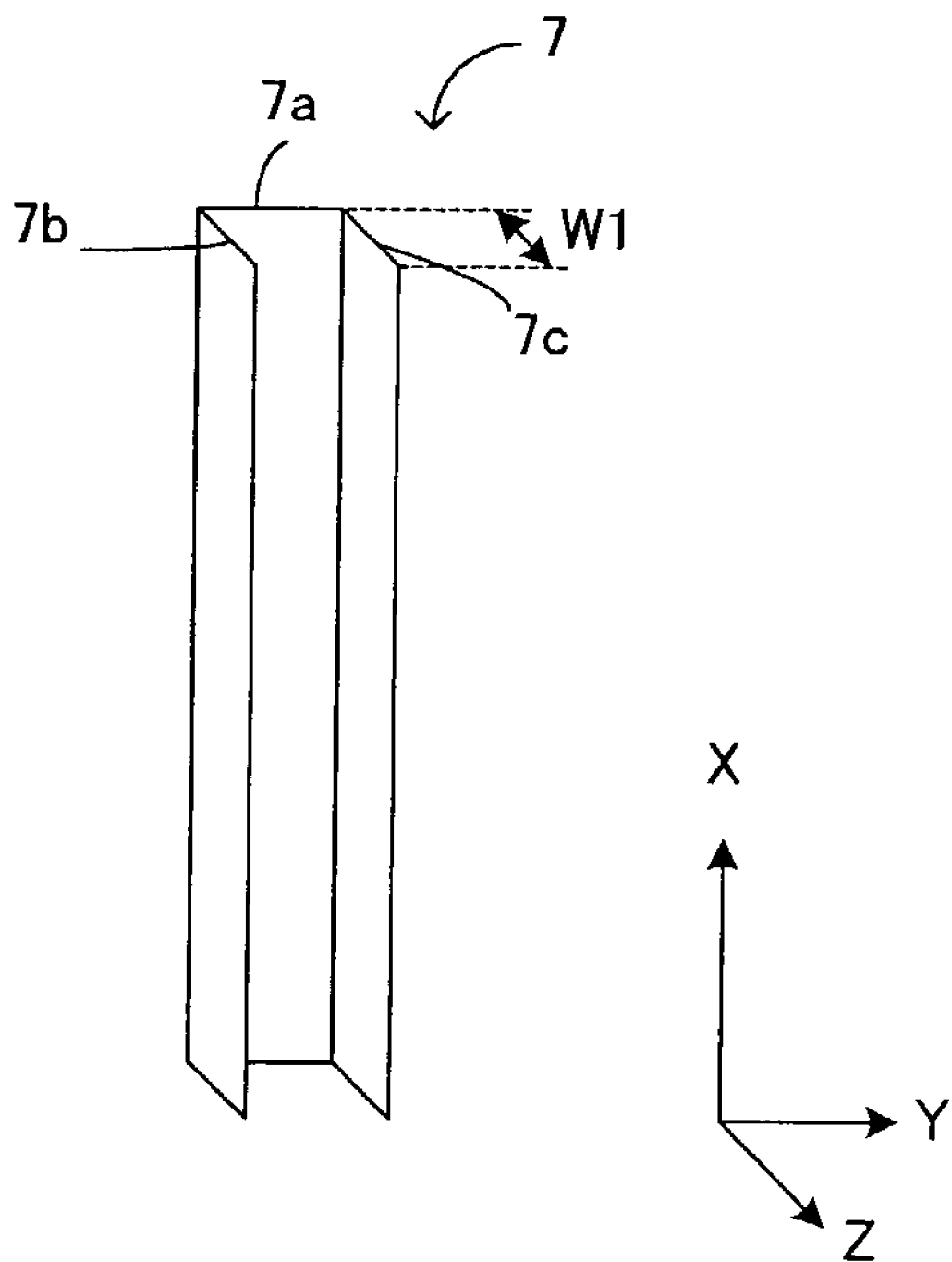
FIG. 2 is a perspective view of a U-shaped plate member forming a curved passage for an agitator according to the first embodiment.
Figure 3:
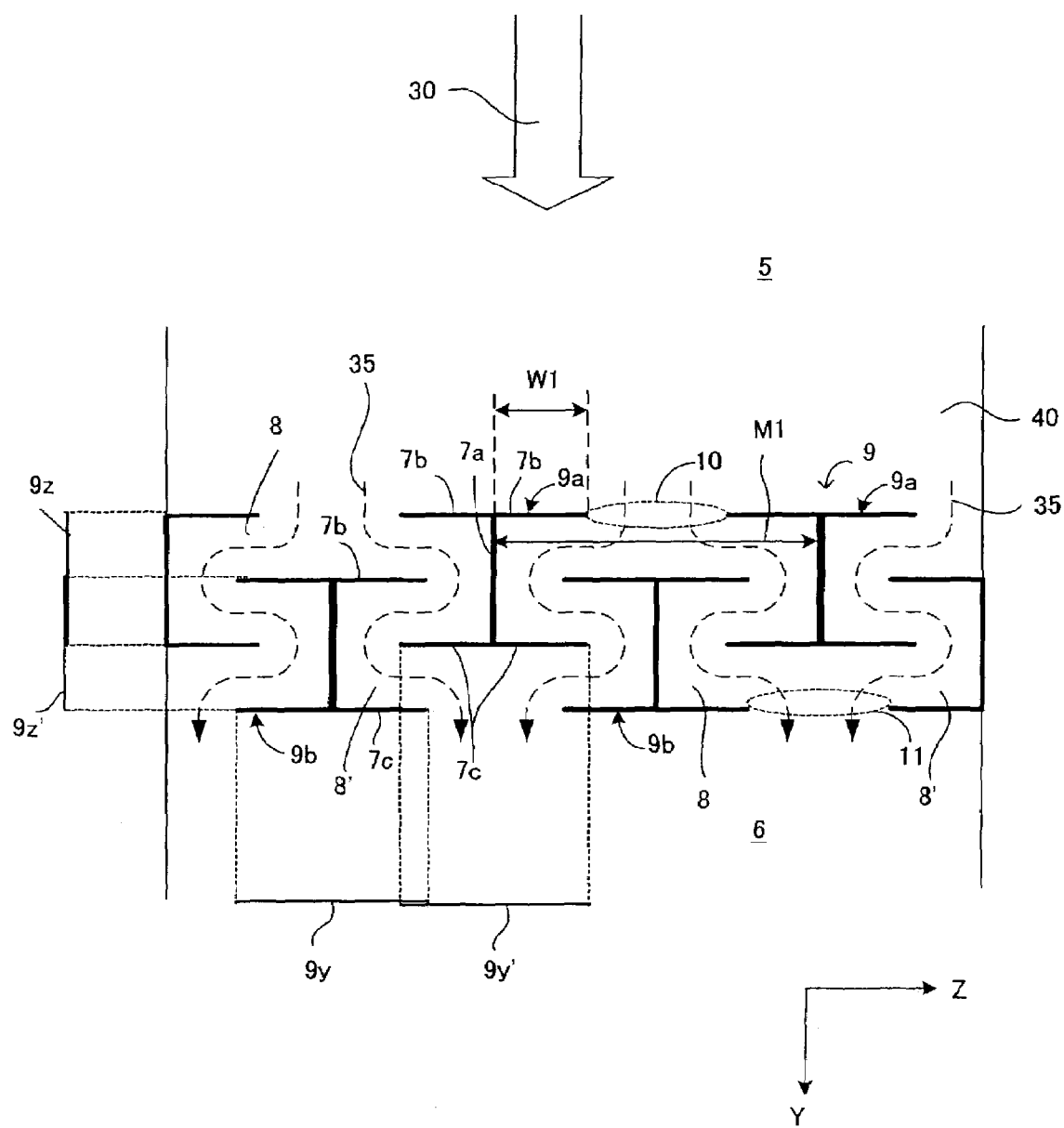
FIG. 3 is a schematic sectional view showing the curved passage of the agitator according to the first embodiment.

A plurality of substantially S-shaped curved passages 8 are formed as shown in FIG. 3 by combining U-shaped plate members 7 which are U-shaped in cross section as shown in FIG. 2. The U-shaped plate members 7 form rectangular grooves which correspond to the indentations of the curved passages 8 which have an S-shape or a reverse S-shape.

The U-shaped plate members 7 comprise three flat plates which are lateral plate 7a, an upper plate 7b and a lower plate 7c. The upper plate 7b and the lower plate 7c are substantially identical in size and in shape. The upper plate 7b and the lower plate 7c are substantially perpendicular with respect to the lateral plate 7a. In FIG. 2, the X axis, the Y axis and the Z axis are mutually perpendicular. The lateral plate 7a is parallel to the X-Y plane. The upper plate 7b and the lower plate 7c extend from the lateral plate 7a along the Z axis. The upper plate 7b and the lower plate 7c are parallel to the X-Z plane. The U-shaped plate member 7 may be formed by bending a single plate member or by bringing three flat plates into contact. Furthermore the height of the U-shaped plate member 7 is substantially equal to the height of the main passage 40 for reformate gas. The height of the U-shaped plate member 7 and the height of the main passage 40 are on the X axis in FIG. 2. The contact of the lateral plate 7a with two U-shaped plate members 7 forms a H-shaped plate member 9 which has a substantially H-shaped cross section. Two upper plates 7b form one side plate of a H-shaped plate member 9 and two lower plates 7c form the other side plate of a H-shaped plate member 9. (It should be noted that, in a H-shaped plate, one of the two U-shaped plate members 7 is in an inverted position from the other U-shaped plate member.)

FIG. 3 shows the structure of the agitator 4. The main stream 30 of reformate gas occurs in the main passage 40. The reformate gas reaches the agitator 4 through the main passage 40. The main passage 40 branches into a plurality of curved passages 8 (secondary passages) provided in the agitator 4. The H-shaped plate member 9 impedes the main stream 30 of reformate gas and the main stream 30 flowing through the main passage 40 branches into a plurality of sub-streams 35 flowing through the curved passages 8. Thus the agitator 4 separates the main stream 30 of reformate gas into a plurality of sub-streams 35 which flow through the respective curved passages 8.

The curved passages 8 are disposed in a single row along a direction (the Z axis in FIG. 3) normal to the main stream 30, having alternately a S-shaped cross section and a reverse S-shaped cross section. The curved passage 8 having a S-shape and the curved passage 8' with a reverse S-shape are disposed such that they are substantially symmetrical to a plane parallel to the Y axis of a direction of the main stream 30.

The lateral plate 7a of each H-shaped plate member 9 (which is a combination of two U-shaped plate members 7) is disposed substantially along the direction of the main stream 30 of reformate gas. Consequently the direction of the main stream 30 is along the Y axis. Furthermore the upper plate 7b of each U-shaped plate member 7 is disposed upstream of the lower plate 7c.

A plurality of H-shaped plate members 9 are arranged in two staggered rows extending along the Z axis normal to the direction of the main stream 30, forming a zigzag pattern. One row is formed upstream and the other row is formed downstream. Adjacent H-shaped plate members 9a, 9b are interdigitated with each other.

Therefore, the lower plate 7c of the H-shaped plate member 9a provided in the upstream row is disposed between adjacent H-shaped plate members 9b in the downstream row. When the device is viewed along the Z axis, with respect to the direction of the main stream of reformate gas, the H-shaped plate member 9b provided in the downstream row overlaps with approximately half of adjacent H-shaped plate members 9a in the upstream row.

A distance M1 between the lateral plate 7a of adjacent H-shaped plate members 9 in each row is set to be greater than twice and less than or equal to four times the width W1 of the upper plate 7b (or the lower plate 7c). Adjacent H-shaped plate members 9a, 9b are disposed so that their cross sections (projected areas) projected in the direction of the stream 30 in the main passage 40 (for example 9y and 9y' in FIG. 3) partially overlap. Further adjacent H-shaped plate members 9a, 9b are disposed so that their cross sections (projected areas) projected in a perpendicular direction with respect to the stream 30 in the main passage 40 (for example 9z and 9z' in FIG. 3) partially overlap. In this manner, it is possible for the reformate gas passages to contain a plurality of curved passages 8 formed from a plurality of curves.

An inlet 10 to the curved passage 8 for reformate gas is formed between adjacent H-shaped plate members 9a in the upstream row. Furthermore an outlet 11 from the curved passage 8 is formed between adjacent H-shaped plate members 9b in the downstream row. Reformate gas with air mixed therein by the oxidizing agent inlet 5 is introduced into the plurality of curved passages 8 from the inlet 10. Reformate gas is adapted to flow about the upper plate 7b of the downstream H-shaped plate member 9b along the indentation of the U-shaped plate member 7 of the upstream H-shaped plate member 9a. Furthermore reformate gas is adapted to flow about the lower plate 7c of the upstream H-shaped plate member 9a along the indentation of the U-shaped plate member 7 of the downstream H-shaped plate member 9b. Thereafter reformate gas is discharged from the outlet 11.

In this manner, agitation of air and the reformate gas is promoted by allowing flow of reformate gas supplied with air in a curved passage 8 having at least two curves. In the agitator 4, U-shaped plate members 7 formed from flat plates are repeatedly disposed to form a curved passage 8. Due to the fact that the flow of reformate gas collides with a plurality of plate faces, it is possible to produce turbulent flow. This promotes mixing of reformate gas and air. In this manner, it is possible to perform more efficient removal of CO since a gas comprising a uniform mixture of air and reformate gas is supplied to the CO removal catalyst 6.

Since the member comprising the agitator 4 merely comprises a U-shaped plate member 7, it is possible to form an agitator 4 performing highly efficient agitation operations with a compact simple structure. Furthermore the formation of a plurality of curved passages 8 creates a uniform mixture of air and reformate gas without greatly impeding the flow of reformate gas. Thus pressure loss resulting from the supply of reformate gas to the CO oxidizer 1 can be suppressed.

The description above described two rows of H-shaped plate members 9 comprising an upstream and a downstream row. However any plurality of row is sufficient and there may be three rows or four rows for example. When two rows are provided, the structure of the agitator 4 becomes more compact. Furthermore although there are five U-shaped plate members 7 in a single row, it is possible to determine the number of U-shaped plate members 7 disposed in a single row in response to the cross-sectional area (or width) of the main passage 40. Here the sectional area of the main passage 40 is defined by the sectional area which is perpendicular to the direction of the main stream 30. It is preferred that all of the reformate gas supplied with air flows into the curved passages 8 from the main passage 40.

Next a second embodiment will be described. The structure of the fuel cell system is taken to be that shown in FIG. 1 which corresponds to a first embodiment. The member comprising the agitator 4 is shown in FIG. 4 and the structure of the agitator 4 is shown in FIG. 5.

Figure 4:
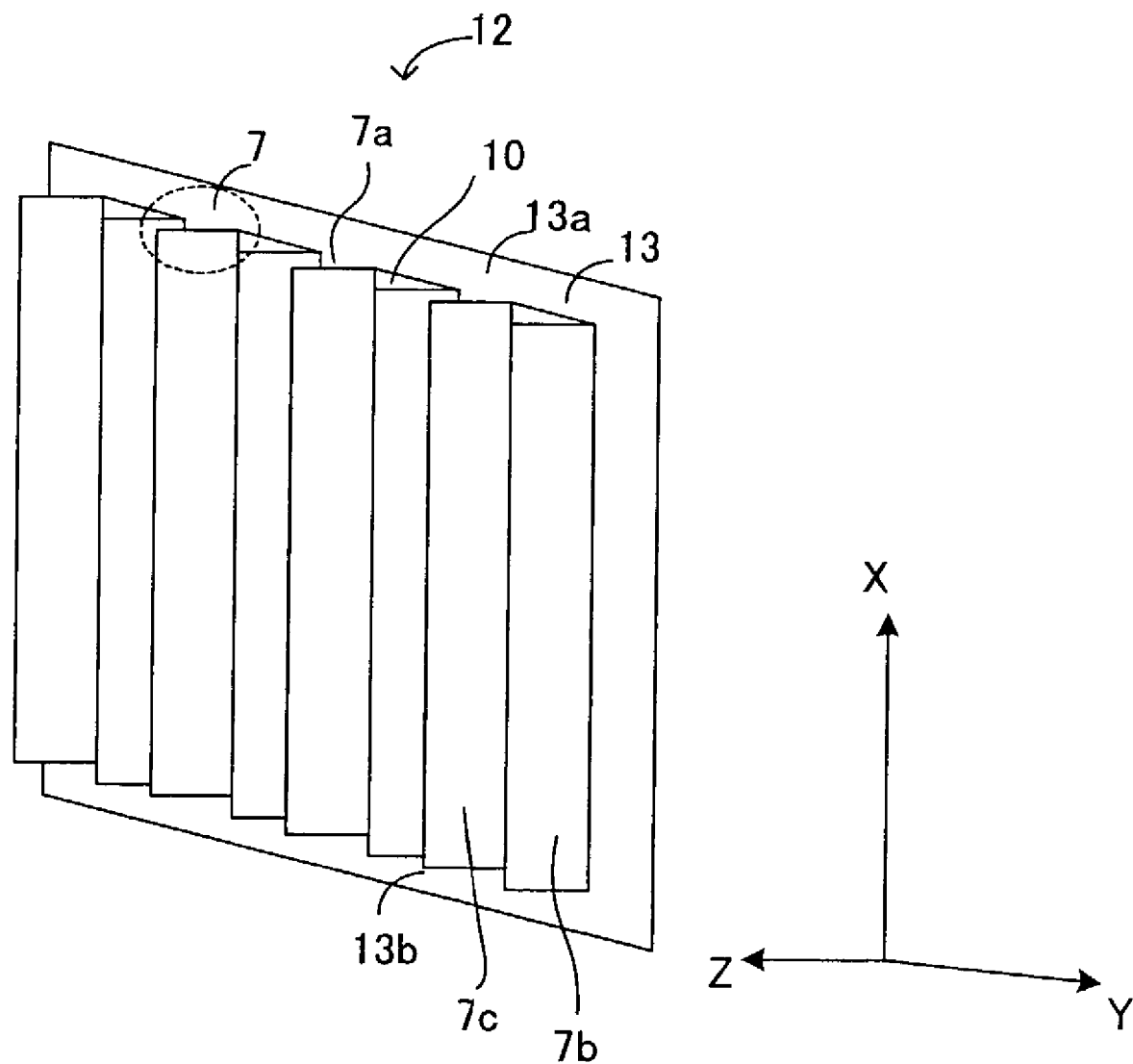
FIG. 4 is a perspective view showing the plate member forming a curved passage in the agitator according to the second embodiment.

As shown in FIG. 4, the member comprising the agitator 4 is a member in which an upper and a lower end in the longitudinal direction (X axis) of the lateral plate 7a of the plurality of U-shaped members 7 (FIG. 2) are connected by respective plate-shaped connecting sections 13a, 13b. This member is termed a connecting U-shaped plate member 12. A space is provided between adjacent U-shaped plate members 7. As described hereafter, this space functions as the inlet 10 or the outlet 11 for reformate gas.

For example, the connecting U-shaped plate member 12 is formed by making a plurality of H-shaped slits in a plate member having approximately the same sectional area as the sectional area of the main passage 40 for reformate gas. The upper plate 7b and the lower plate 7c of the U-shaped plate member 7 can be formed by bending areas corresponding to the upper plate 7b and the lower plate 7c from the plate member. In this manner, it is possible to simply determine the position of the U-shaped plate member 7 by positioning of H-shaped slits in the plate member. Furthermore it is possible to fix the position of the U-shaped plate member 7 in a simple and accurate manner. In FIG. 4, the lateral plate 7a of the U-shaped plate member 7 is parallel to the X-Y plane. The upper plate 7b and the lower plate 7c extend from the lateral plate 7a along the Z axis. The upper plate 7b and the lower plate 7c are parallel to the X-Z plane.

Figure 5:
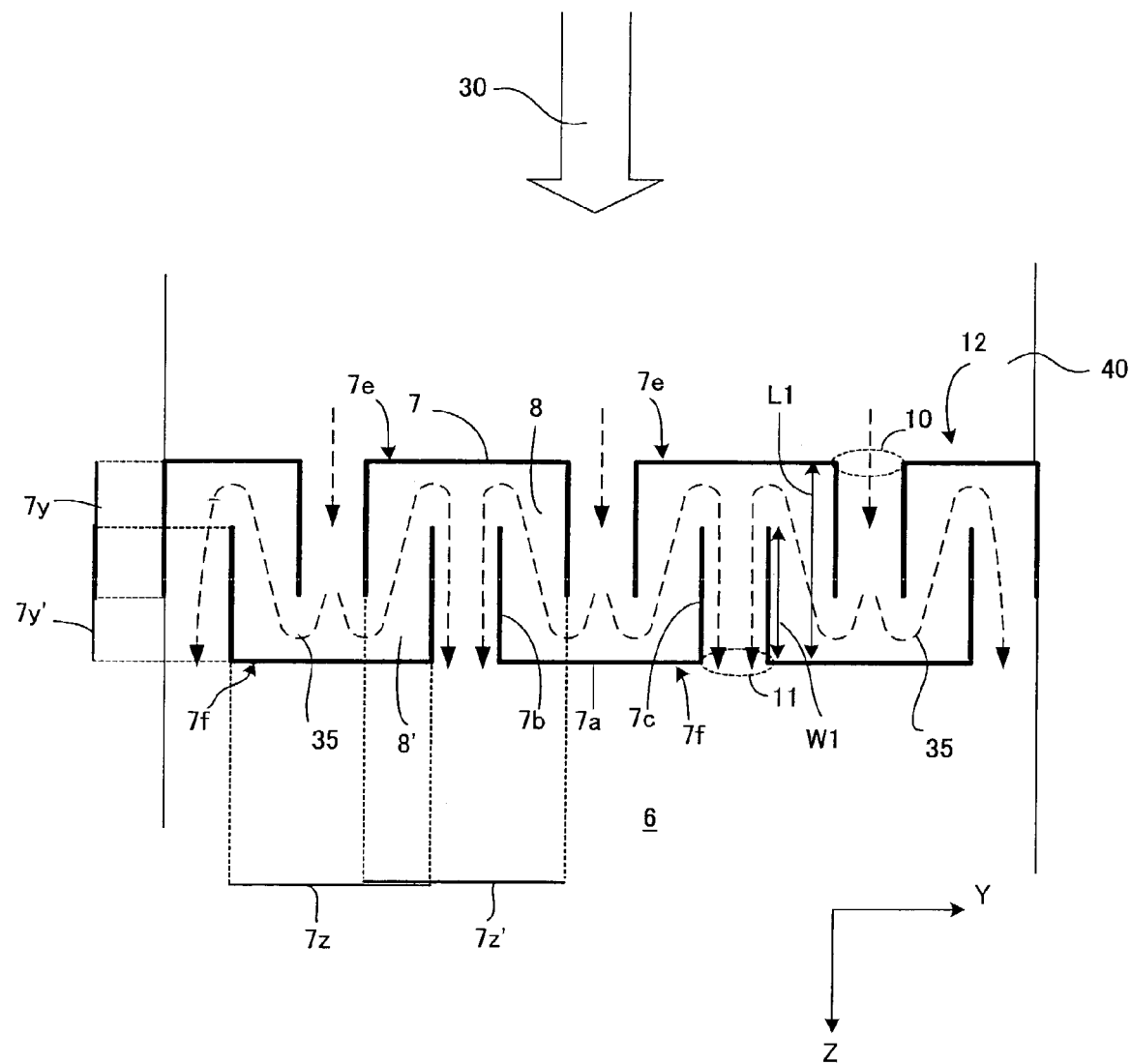
FIG. 5 is a schematic sectional view of the curved passage of the agitator according to the second embodiment.

Referring to FIG. 5, the structure of an agitator 4 using a connecting U-shaped plate member 12 will be described.

Two connecting U-shaped plate members 12 are disposed in two rows parallel to each other so that the indentations of the U-shaped plate member 7 are opposed and aligned in a direction perpendicular to the main stream 30. As shown in FIG. 5, the direction of the main stream 30 corresponds to the Z axis. That is to say, it corresponds to the orientation of the upper plate 7b and the lower plate 7c of the U-shaped plate member 7. Furthermore the two rows of U-shaped plate members 7 are oriented with respect to the Y axis. Thus a plurality of U-shaped plate members 9 are arranged in two staggered rows extending along the Y axis normal to the direction of the main stream 30, forming a zigzag pattern. The U-shaped plate members 7 are interdigitated with each other.

The upstream and downstream connecting U-shaped plate members 12 disposed so that the upper plate 7b and lower plate 7c disposed adjacent each other are contained in a single indentation of the downstream U-shaped plate member 7. The distance L1 between the upstream and downstream lateral plates 7a is set to be larger than and less than twice the width W1 of the upper plate 7b (or the lower plate 7c). This results in the formation of a substantially N-shaped (or reverse N-shaped) curved passage 8 having a plurality of bends. Adjacent U-shaped plate members 7e, 7f including an upstream U-shaped plate member 7e and a downstream U-shaped plate member 7f are disposed so that their cross sections (projected areas) projected on a common plane perpendicular to the main stream 30 partially overlap (for example 7z and 7z' in FIG. 5). Furthermore adjacent U-shaped plate members 7e, 7f are disposed so that their cross sections (projected areas) projected on a common plane parallel to the main stream 30 partially overlap (for example 7y and 7y' in FIG. 5).

The main passage 40 branches into a plurality of curved passages 8 (secondary passages) provided in the agitator 4. The U-shaped plate member 7 impedes the main stream 30 of reformate gas and the main stream 30 flowing through the main passage 40 is divided into a plurality of sub-streams 35 flowing through the curved passages 8. The curved passages 8 are disposed in a single row along a direction (Y axis in FIG. 5) normal to the main stream 30, having alternately N-shaped and reverse N-shaped cross sections. The curved passage 8 with an N-shape and the curved passage 8' with a reverse N-shape are disposed such that they are substantially symmetrical to a plane parallel to the Z axis of a direction of the main stream 30.

The reformate gas flows into the agitator 4 from the inlet 10 of the curved passage 8 formed between the upstream U-shaped plate members 7e. The sub-streams 35 of reformate gas curve along the upper plate 7b and the lower plate 7c. Thereafter the sub-streams 35 of reformate gas are discharged from the outlet 11 of the curved passage 8 formed between the downstream U-shaped plate members 7f.

The reformate gas produces an eddy from turbulent flow as a result of multiple collisions with the wall faces of the U-shaped plate members 7. Thus it is possible to promote mixture of air and reformate gas. This embodiment fixes the position of each U-shaped plate member 7 in a simple manner with respect to the cross section of the main passage 40 due to the fact that the connecting U-shaped plate members 12 are formed from a single plate.

A third embodiment will be described hereafter. The fuel cell system is arranged as shown in FIG. 1 in the same manner as the first embodiment. The member constituting the agitator 4 is shown in FIG. 6 and the structure of the agitator 4 is shown in FIG. 7.

Figure 6:
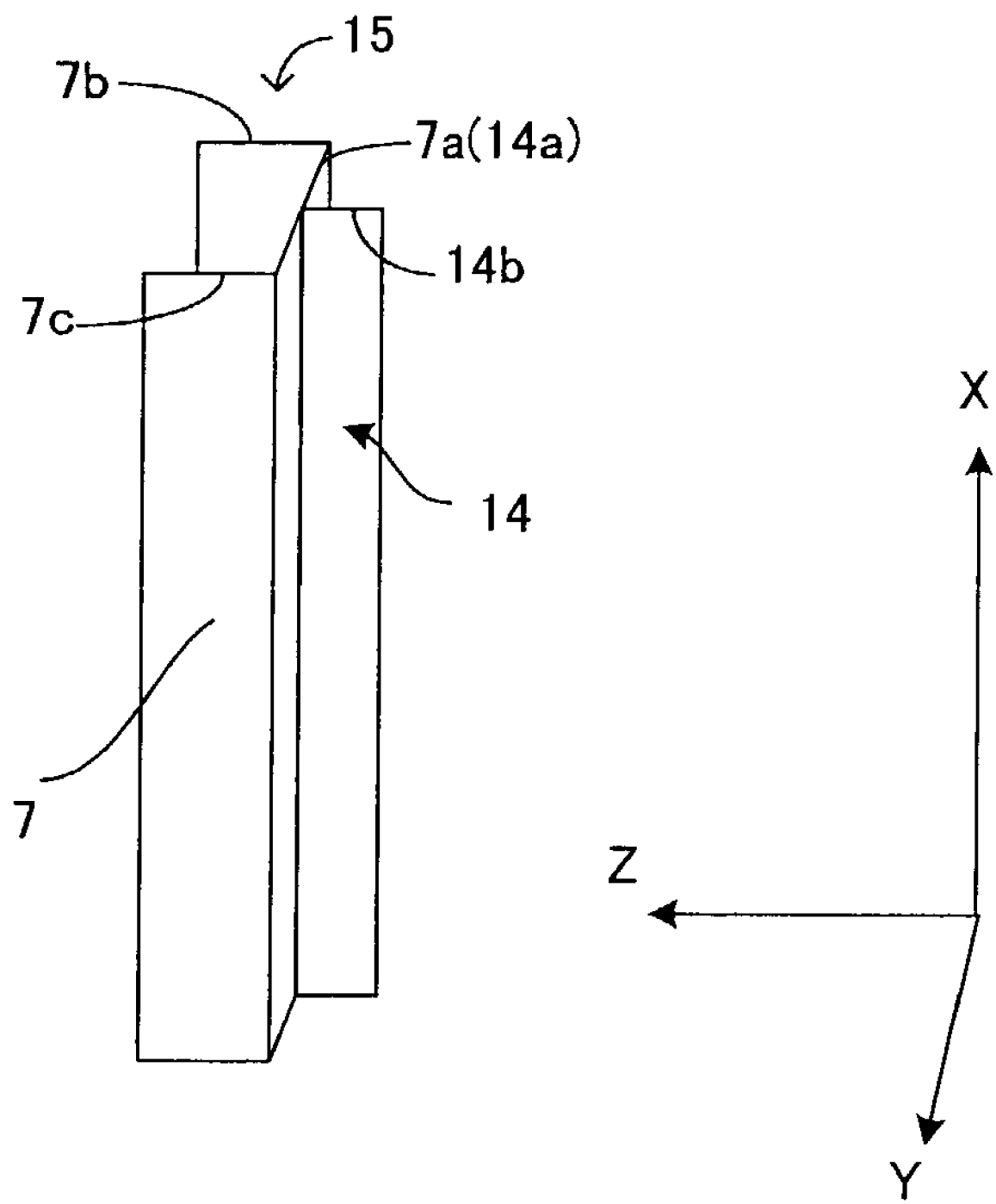
FIG. 6 is a perspective view of the shape of a plate member forming a curved passage according to the third embodiment.
Figure 7:
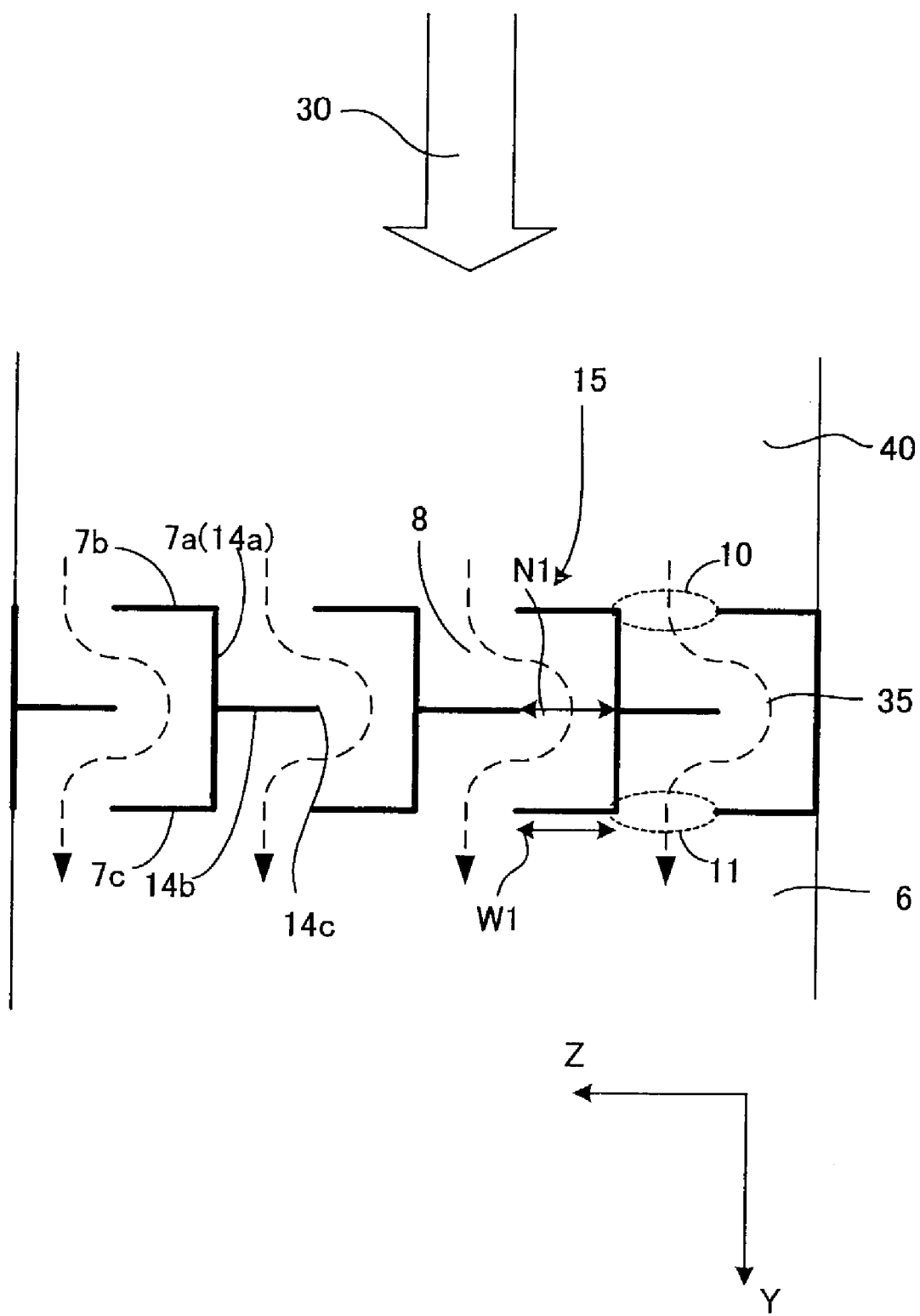
FIG. 7 is a schematic sectional view of the curved passage of the agitator according to the third embodiment.

As shown in FIG. 6, the member constituting the agitator 4 is a composite plate member 15 integrating a U-shaped plate member 7 shown in FIG. 2 and a T-shaped plate member 14 having a cross-section in the shape of a letter "T". The lateral plate 7a of the U-shaped plate member 7 also comprises a horizontal section 14a of the T-shaped plate member 14. The perpendicular section 14b of the T-shaped plate member 14 comprises a projection which projects perpendicular to the lateral plate 7a of the U-shaped plate member 7. Thus the composite plate member 15 is such that the perpendicular section 14b is connected to the U-shaped plate member 7. In FIG. 6, the lateral plate 7a are parallel to the X-Y plane. The upper plate 7b and the lower plate 7c extend from the lateral plate 7a along the Z axis. The upper plate 7b and the lower plate 7c are parallel to the X-Z plane.

A plurality of composite plate members 15 having the above structure are disposed so that the lateral plate 7a is oriented along the main stream 30 of reformate gas and so that the indentation of the U-shaped plate member 7 faces the same direction. In FIG. 7, the direction of the main stream 30 corresponds to the Y axis. At this time, the plurality of composite plate members 15 are aligned in a single row perpendicular (towards the Z axis) to the main stream 30 of reformate gas. In other words, the perpendicular section 14b is substantially perpendicular to the main stream 30 of reformate gas and is oriented to be positioned substantially in the center of the indentation of adjacent U-shaped plate members 7. Furthermore the end 14c of the perpendicular section 14b does not come into contact with the lateral plate 7a of U-shaped plate member 7 and is disposed so that the distance N1 between the end 14c and the lateral plate 7a is smaller than the width W1 of the upper plate 7b or the lower plate 7c. Thus, adjacent composite plate members 15 are disposed so that their cross sections (projected areas) projected in the direction of the main stream 30 partially overlap and so that their cross sections (projected areas) projected in the direction perpendicular to the main stream 30 partially overlap. In this manner, it is possible to form a curved passage 8 substantially in the shape of a letter "U" which has a plurality of turns. Thus the curved passages 8 having an U-shaped cross section are arranged in a row along a direction (Z axis in FIG. 7) normal to the main stream 30.

Reformate gas flows from the inlet 10 formed between the upper plate 7b of adjacent U-shaped plate members 7, bypasses the perpendicular section 14b of the U-shaped plate member 7 along the indentation of the U-shaped plate member 7 and is discharged from the outlet 11 formed between the lower plates 7c of the U-shaped plate member 7.

Reformate gas produces an eddy from turbulent flow as a result of multiple collisions with the wall faces of the U-shaped plate members 7. Thus it is possible to promote mixture of air and reformate gas. Since the member comprising the agitator 4 integrates the U-shaped plate member 7 and the T-shaped plate member 14, it is possible to perform efficient agitation operations with a simple structure.

A fourth embodiment will be described hereafter.

Figure 8:
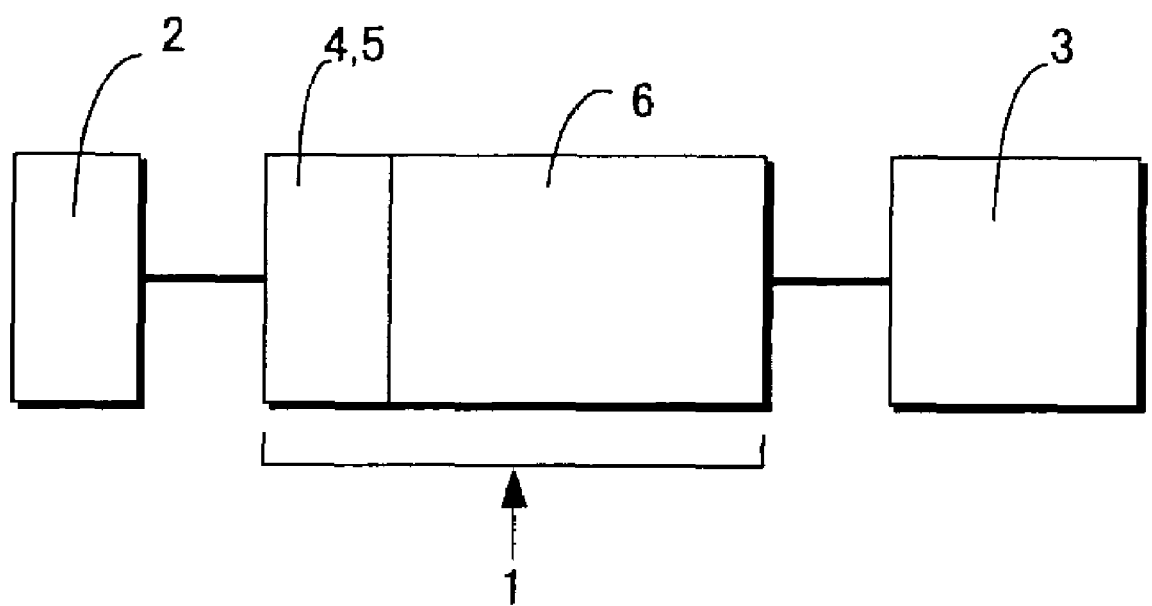
FIG. 8 is a schematic diagram showing the structure surrounding a CO oxidizer in a fuel cell system according to a fourth to seventh embodiment.

FIG. 8 shows the structure of a fuel cell system employing the present embodiment. The oxidizing agent inlet 5 for oxidizing agent is formed in the agitator 4. In this manner, it is possible to make the CO oxidizer 1 compact by integrating the oxidizing agent inlet 5 and the agitator 4.

Figure 9:
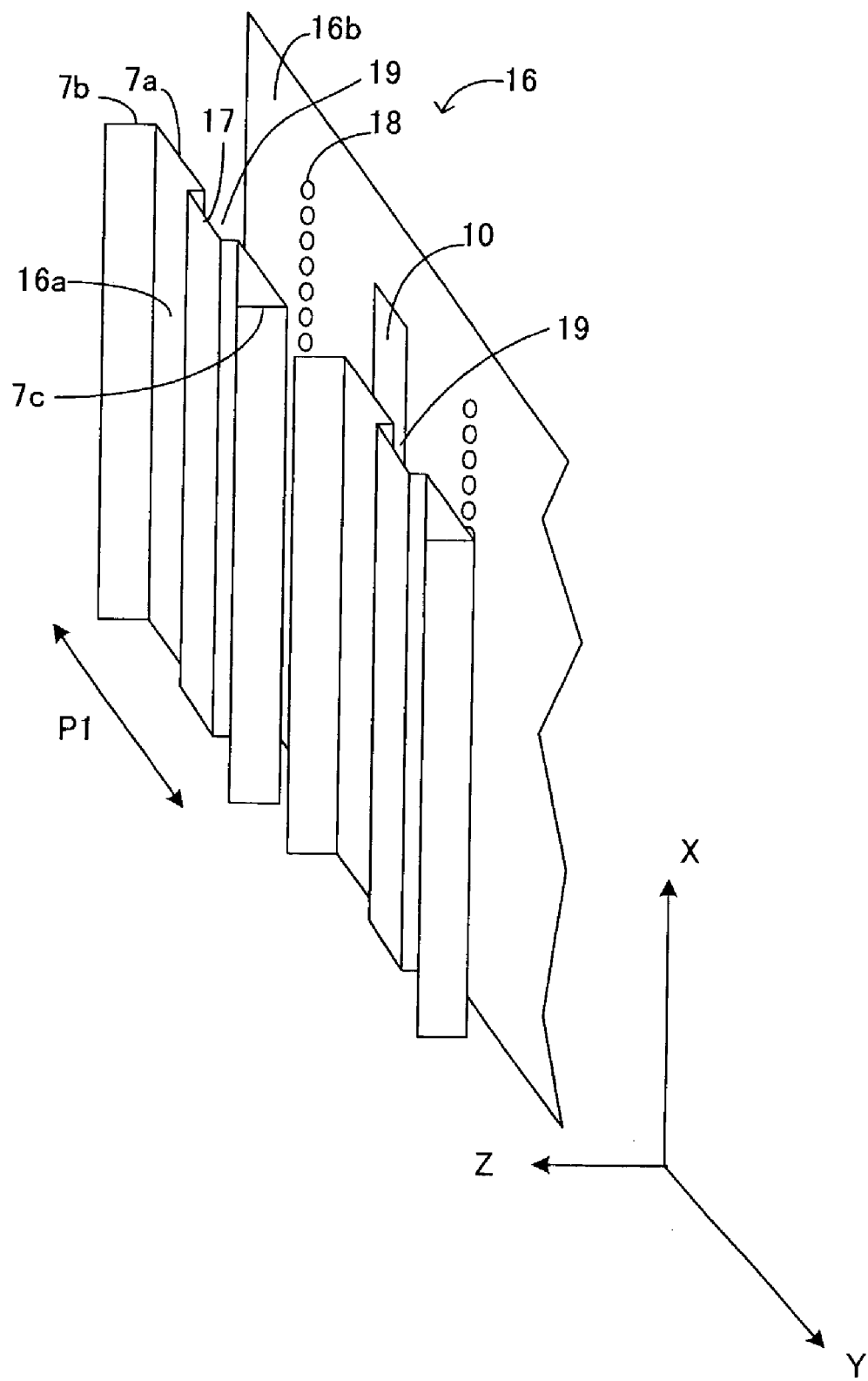
FIG. 9 is an exploded perspective view of an upstream member of the agitator according to the fourth embodiment.
Figure 10:
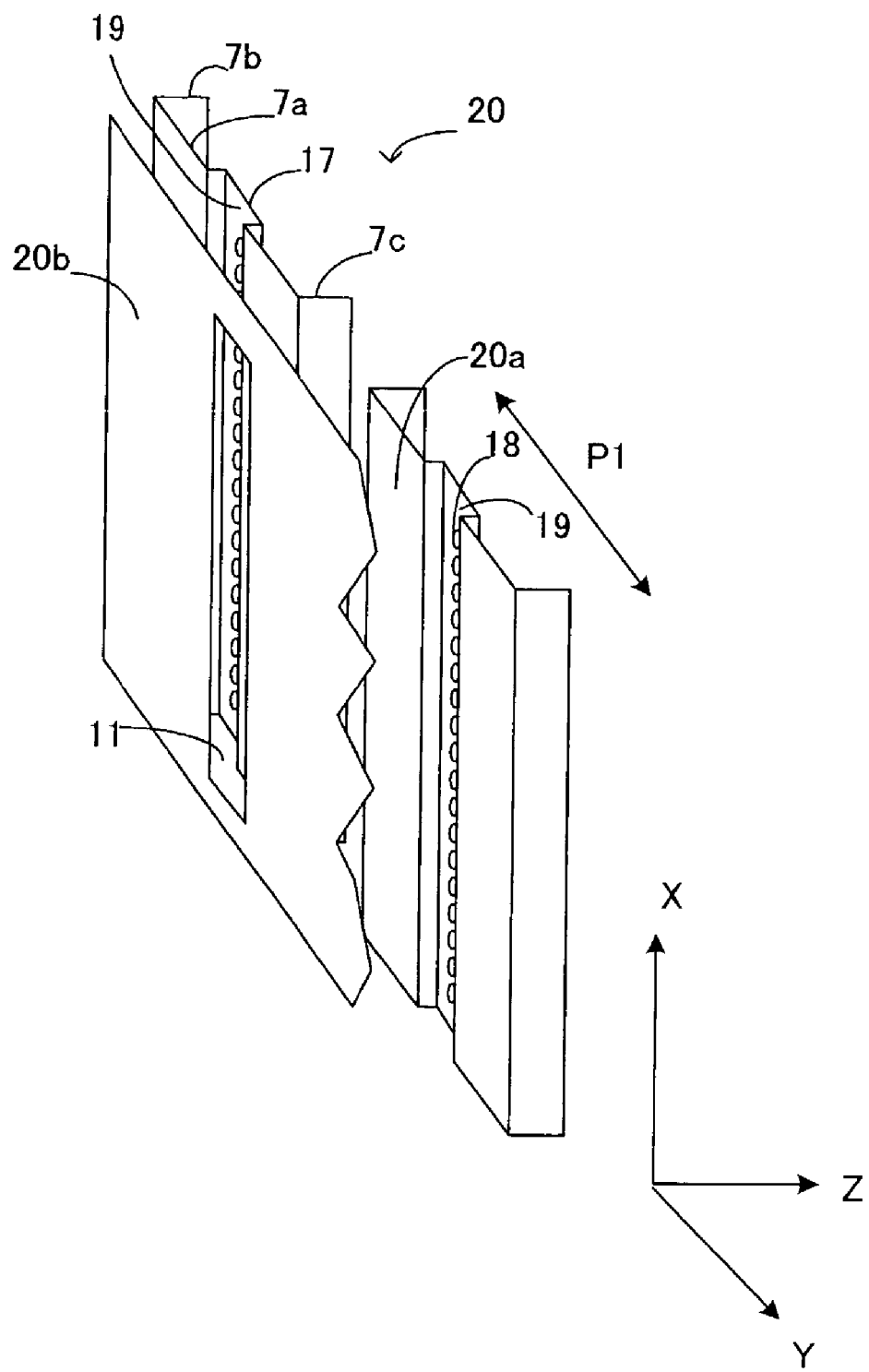
FIG. 10 is an exploded perspective view of a downstream member of the agitator according to the fourth embodiment.
Figure 11:
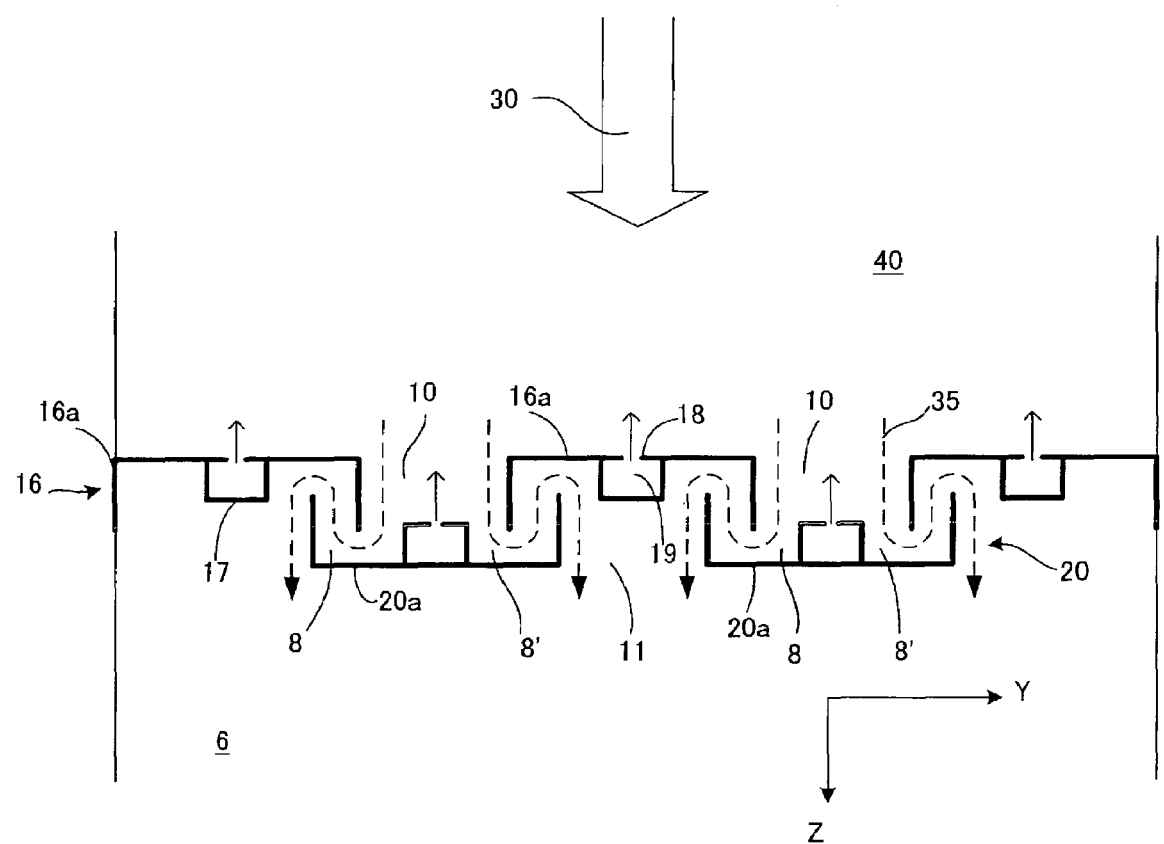
FIG. 11 is a schematic sectional view showing the curved passage of the agitator according to the fourth embodiment.

FIG. 11 shows the structure of the agitator 4 and FIG. 9 and FIG. 10 show the member comprising the agitator 4 (containing the oxidizing agent inlet 5). In this embodiment, the member shown in FIG. 9 is disposed upstream and the member shown in FIG. 10 is disposed downstream.

In FIG. 9, an upstream inlet member 16 having a cross sectional area substantially equal to the cross sectional area of the main stream 40 includes an indented member 16a and an inlet plate member 16b. The indented member 16a corresponds to the U-shaped plate member 7 provided with a projection 17 in the center of the lateral plate 7a. In FIG. 9, the lateral plate 7a is parallel to the X-Y plane. The upper plate 7b and the lower plate 7c extend from the lateral plate 7a towards the Z axis. Furthermore the projection 17 projecting along the Z axis extends along the length of the lateral plate 7a (X axis) in the indentation of the U-shaped plate member 7. Since the projection 17 is normally small, the indented member 16a has an overall shape in the form of a letter "U".

Openings are provided in the inlet plate member 16b. The openings become the inlets 10 of the curved passages 8 and are disposed at an interval which is equal to the width P1 of the indented member 16a. A plurality of air discharge holes 18 aligned in a row along the X axis are formed in the inlet plate member 16b which faces the projection 17 of the indented member 16a.

In this manner, the indented member 16a is disposed between inlets 10. A space defined by the projection 17 and the inlet plate member 16b comprises an air passage 19. Air is supplied to the air passage 19 from an air source (not shown) and air is discharged from air discharge holes 18 formed in the inlet plate member 16b.

On the other hand, a downstream inlet member 20 is formed from an indented member 20a and a plate member 20b. The indented member 20a is the same shape as the indented member 16a shown in FIG. 9. However air discharge holes 18 are formed on the end of the projection 17 extending along the X axis. The plate member 20b has a sectional area which is substantially equal to the cross sectional area of the main passage 40 for reformate gas. Furthermore an outlet 11 is formed in the plate member 20b for the curved passage 8 by providing gaps disposed at an interval which is equal to the width P1 of the indented member 20a. Thus an air passage 19 is formed by combining the indented member 20a and the plate-shaped member 20b in the same manner as the upstream inlet member 16.

Next referring to FIG. 11, the structure of an agitator 4 combining the inlet member 16 and the inlet member 20 will be described. The indented members 16a, 20a are disposed in two staggered rows extending along the Y axis normal to the direction of the main stream 30, forming a zigzag pattern, so that the respective indentations are opposed in the same manner as the U-shaped plate member 7 shown in FIG. 5. The direction of the main stream 30 corresponds to the Z axis. The indented members 16a constitutes an upstream row and the indented members 20a constitutes a downstream row. Adjacent indented members 16a, 20a are disposed so that their cross sections (projected areas) projected in the direction of the main stream 30 partially overlap and so that their cross sections (projected areas) projected in the direction perpendicular to the main stream 30 flowing in the main passage 40 partially overlap.

The curved passages 8 are disposed in a row along a direction (Y axis in FIG. 11) normal to the main stream 30, having alternately N-shaped and reverse N-shape cross sections. The curved passage 8 with an N-shape and the curved passage 8' with a reverse N-shape are disposed such that they are substantially symmetrical to a plane parallel to the Z axis of a direction of-the main stream 30.

Firstly air form the air discharge holes 18 formed in the upstream inlet member 16 is introduced into the reformate gas. Thereafter the reformate gas is supplied to the curved passage 8 from the inlet 10 of the N-shaped curved passage 8. The inlet 10 is formed between the upstream indented member 16a. Air from the air discharge holes 18 formed in the downstream inlet member 20 becomes mixed with the reformate gas. Thereafter reformate gas flows through the curved passage 8 and is discharged from the outlet 11 in the same manner as the second embodiment.

In this manner, it is possible to integrate the agitator 4 and the oxidizing agent inlet 5 comprising the air passage 19 and the air discharge holes 18. Therefore it is possible to ensure sufficient dispersion of air in the reformate gas before it is discharged from the agitator 4 by introducing the air upstream of the curved passage 8. Furthermore it is possible to promote mixing of air with the reformate gas by injecting air upstream with respect to the agitator 4. Furthermore a passage formation member is provided by disposing the indented members 16a, 20a on the plate members 16b, 20b which have a cross sectional area which is substantially equal to the cross sectional area of the main passage 40. Consequently it is possible to simplify the positioning of each indented member 16a, 20a in the cross section of the main stream 30 before they are disposed.

A fifth embodiment of this invention will be described below. FIG. 8 shows the structure of a fuel cell system which is the same as that described with reference to the fourth embodiment. The member comprising the agitator 4 is shown in FIG. 12 and the structure of the agitator 4 is shown in FIG. 13.

Figure 12:
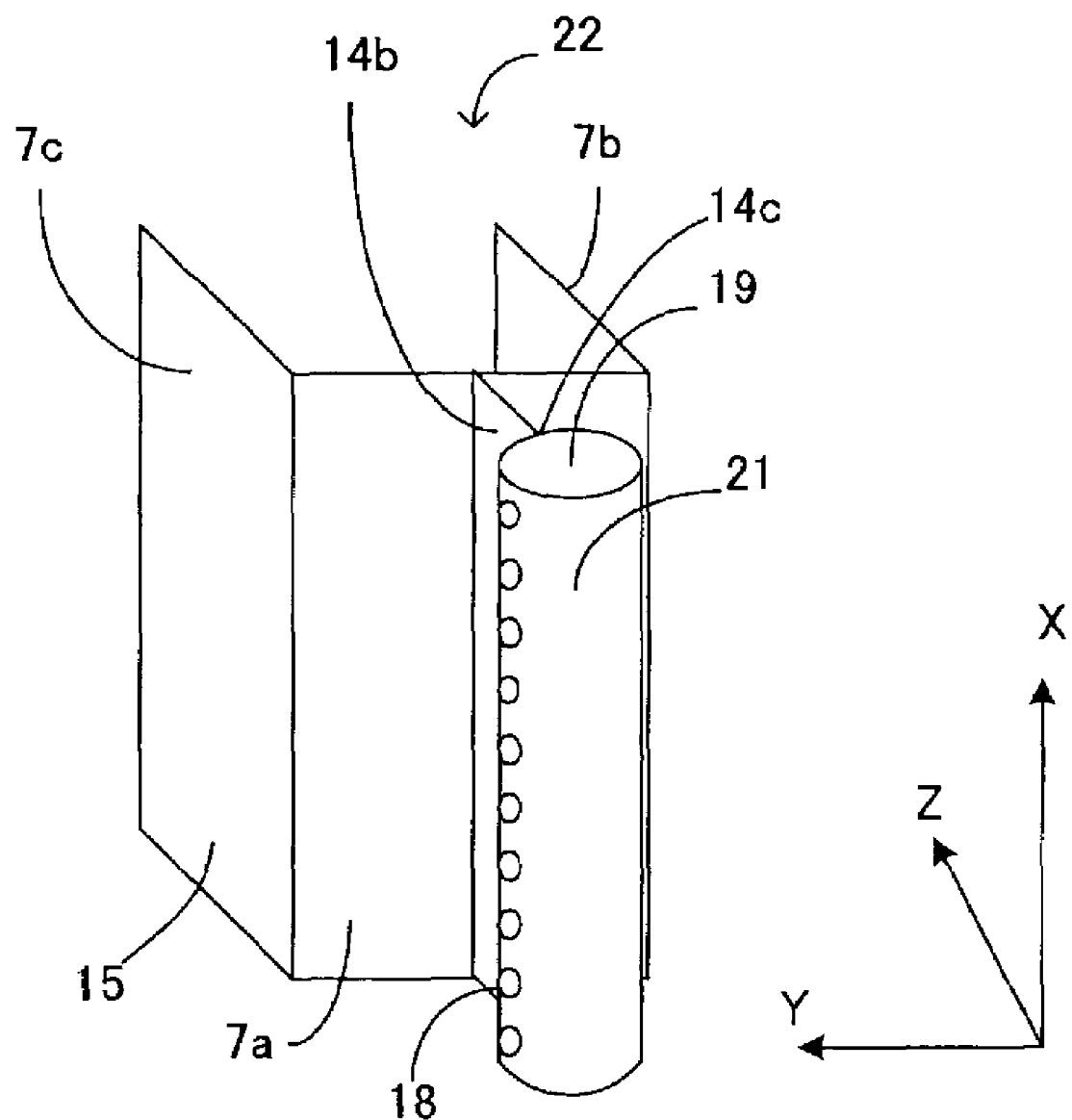
FIG. 12 is a perspective view showing the member forming the curved passage in the agitator according to the fifth embodiment.

Referring to FIG. 12, the agitator 4 includes a composite plate member 22 which is the composite plate member 15 (shown in FIG. 6) connected with the air inlet 21. An air inlet 21 which forms a cylindrical air passage 19 is disposed in the end 14c of the perpendicular section 14b of the composite plate member 15. A plurality of air discharge holes 18 are formed on the lateral face of the air inlet 21 and are disposed along the X axis.

Figure 13:
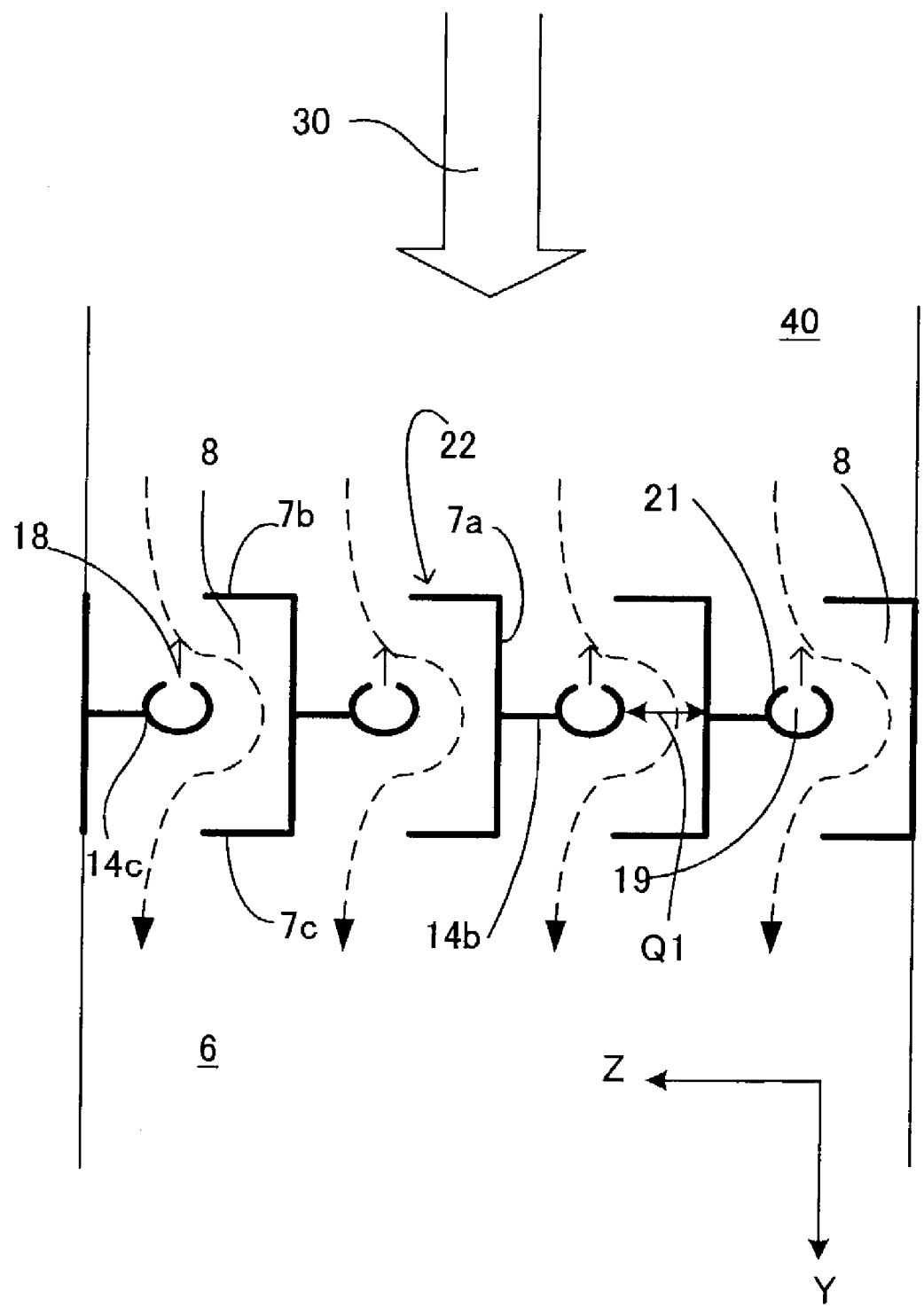
FIG. 13 is a schematic sectional view of the curved passage of the agitator according to the fifth embodiment.

Referring to FIG. 13, a composite plate member 22 formed as described above is disposed in the same manner as shown in FIG. 7. A plurality of composite plate members 22 are disposed in a single row in a direction perpendicular (Z axis) to the direction of the main stream 30 (Y axis). That is to say, the plurality of composite plate members 22 is such that the lateral plate 7a is disposed along the direction of the main stream 30 of reformate gas. In addition, the direction of the upper plate 7b and the lower plate 7c is disposed perpendicular to the direction of the main stream 30. In FIG. 7, a limit is provided on the distance between the lateral plate 7a and the end 14c of the perpendicular section 14b. However in FIG. 13, the distance Q1 between the lateral plate 7a and the air inlet 21 is less than the width W1 of the upper plate 7b and the lower plate 7c. The curved passages 8 having U-shaped cross section are arranged in a row along a direction (Z axis in FIG. 13) normal to the main stream 30.

The air discharge holes 18 are formed on the upstream lateral face of the air inlet 21 and inject air with respect to the upstream orientation of the main stream 30 of reformate gas. In this manner, it is possible to integrate the agitator 4 with the oxidizing agent inlet 5 comprising the air inlet 21 and the air discharge holes 18 and to promote mixing of air with reformate gas. Since air is introduced substantially upstream of the U-shaped curved passage 8, it is possible to ensure sufficient mixing of air and reformate gas before it is discharged from the curved passage 8. Furthermore it is possible to obtain the same effect as the third embodiment.

In this embodiment, although the air inlet 21 has a cylindrical shape, the shape is not limited in that respect.

Figure 14:
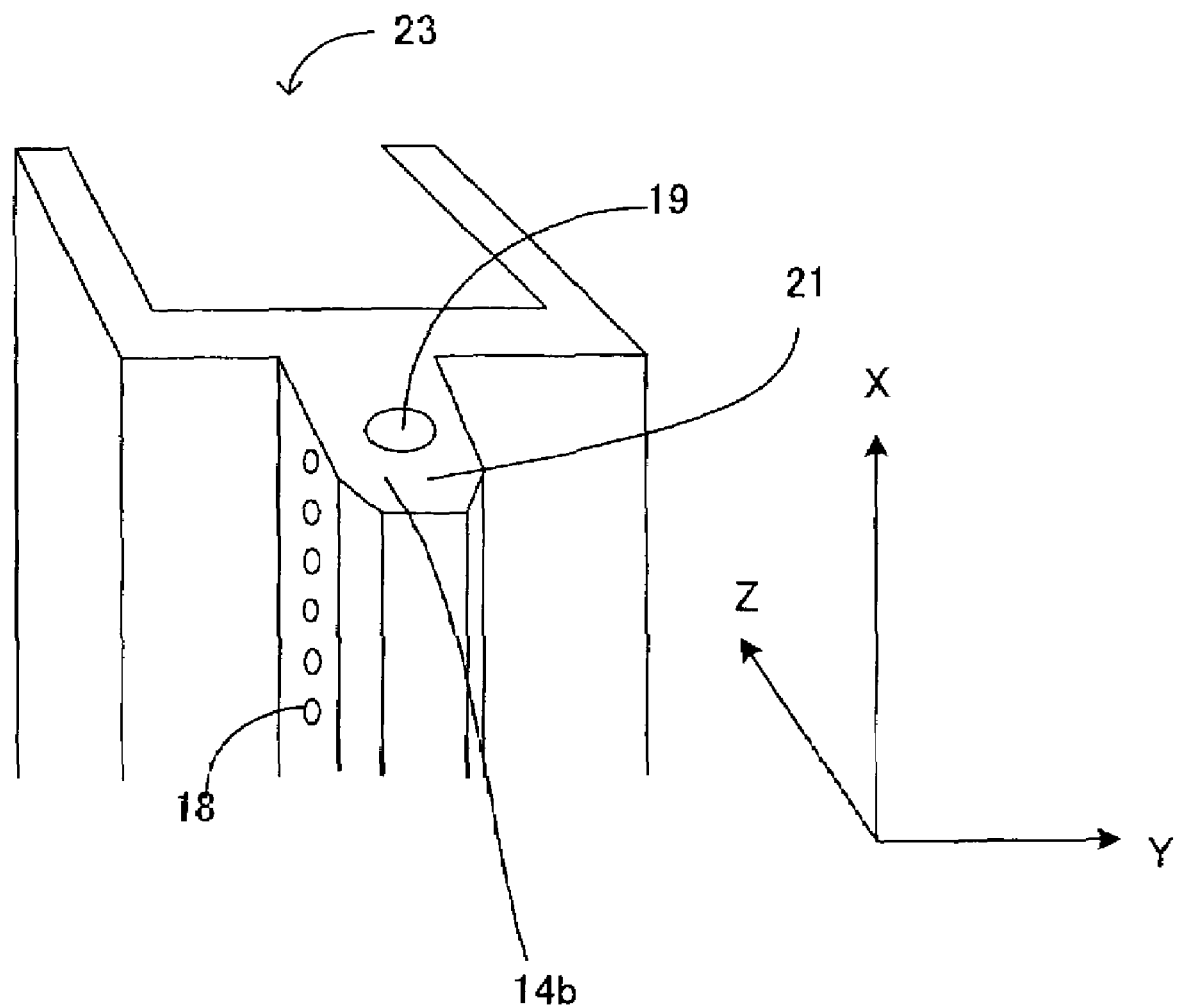
FIG. 14 is a perspective view of the member forming a curved passage in the agitator according to the sixth embodiment.
Figure 15:
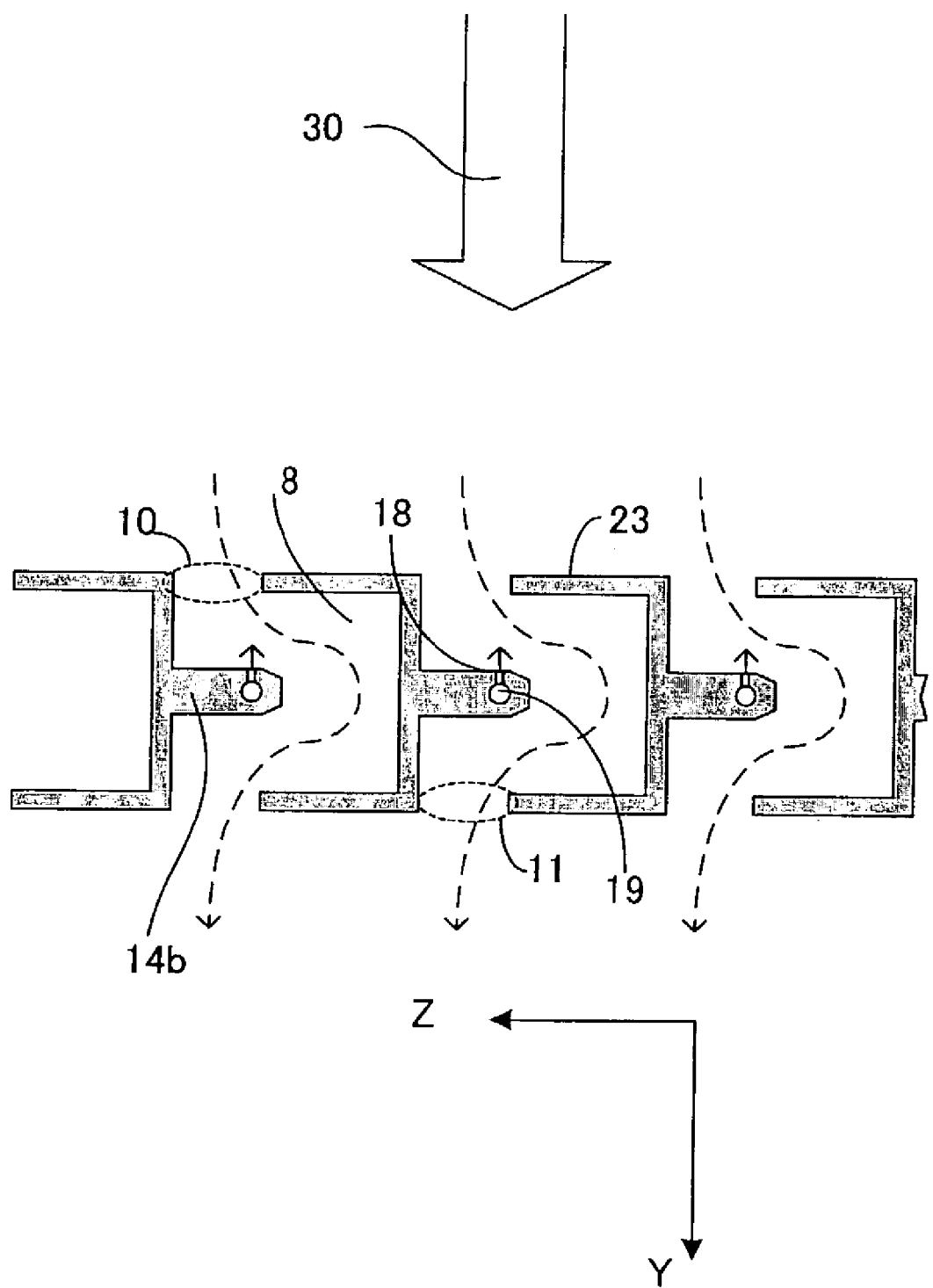
FIG. 15 is a schematic sectional view of the curved passage of the agitator according to the sixth embodiment.

Referring to FIG. 14 and FIG. 15, a sixth embodiment will be described. The structure of the fuel cell system is the same as that shown in FIG. 8. The member comprising the agitator 4 is shown in FIG. 14 and the structure of the agitator 4 is shown in FIG. 15.

In this embodiment, the composite member 23, which is similar to the composite plate member 15 combining the perpendicular section 14b and the U-shaped plate member 7 shown in FIG. 6, is the member constituting the agitator 4. For example, the composite member 23 is formed by carving a metal block or by a drawing process. The composite member 23 is of a sufficient thickness compared with the composite plate member 15. Thus an air passage 19 is formed in the end of the perpendicular section 14b. Furthermore air discharge holes 18 in the upstream lateral face of the perpendicular section 14b are connected with the air passage 19. A plurality of composite members 23 are arranged in a row (along Z axis) perpendicular to the main stream 30.

Thus it is possible to form the air inlet 21 in the perpendicular section 14b without providing a designated member. Since air is injected upstream of the curved passages 8 of reformate gas, it is possible to promote the mixing of air and reformate gas. Furthermore since the overall structure is the same as the fifth embodiment, it is possible to obtain the same effect.

Figure 16:
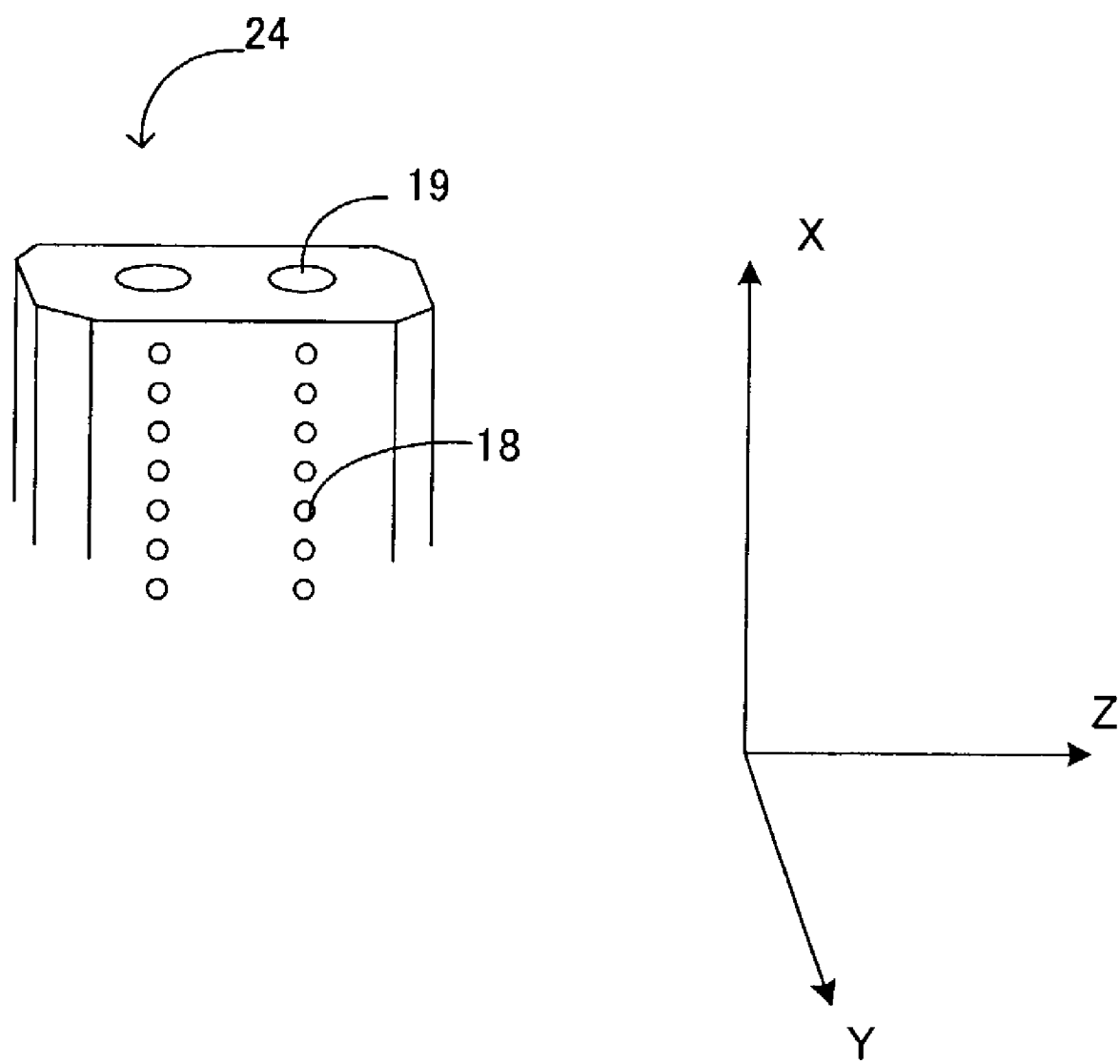
FIG. 16 is a perspective view of the member forming a curved passage in the agitator according to the seventh embodiment.

Referring to FIG. 16, a seventh embodiment will be described. The member comprising the inlet for air in the fuel cell system is shown in FIG. 16 and the structure of the agitator 4 is shown in FIG. 17.

The air inlet 24 has two air passages 19 perpendicular (with respect to X axis) to the main stream 30 on the inner section of a columnar member as shown in FIG. 16. The air inlet 24 comprises air discharge holes 18 along the direction of the Y axis on the lateral face. The air inlet 24 introduces air from the air passage 19 through the air discharge holes 18 on the lateral face into the curved passage 8. In this embodiment, the cross-sectional shape of the air inlet 24 in the shape of column is hexagonal. However the shape is not limited in that respect. The cross-sectional shape of the air inlet 24 may be quadrilateral or circular.

Figure 17:
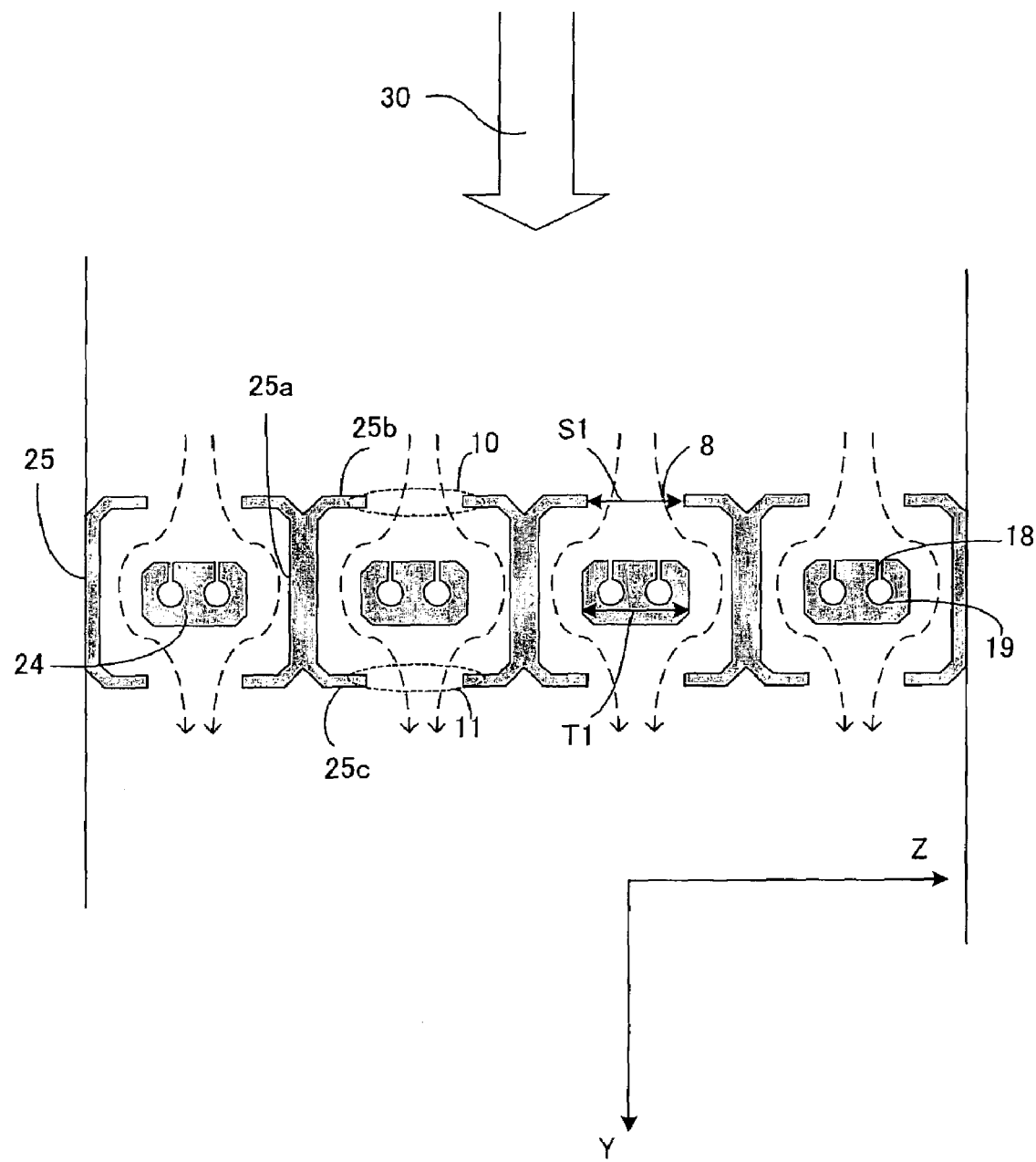
FIG. 17 is a schematic sectional view of the member forming a curved passage in the agitator according to the seventh embodiment.

Referring to FIG. 17, two opposed substantially U-shaped members 25 accommodate the air inlet 24 as shown in FIG. 17. The substantially U-shaped member 25 may comprise the U-shaped member 7 shown in FIG. 2 or may employ a member having smooth corners at two positions in the shape of a letter "U". The substantially U-shaped member 25 can be formed by carving a metal block or by a drawing process in the same manner as the sixth embodiment.

Two lateral plates 25a of substantially U-shaped members 25 are connected to each other to form a substantially H-shaped member and is disposed in a row perpendicular to the main stream 30 of reformate gas. A space is formed between the upper plates 25b of adjacent substantially U-shaped members 25 and between the lower plates 25c of adjacent substantially U-shaped members 25. The upstream section of the space functions as an inlet 10 and the downstream section functions as an outlet 11. The air inlet 24 is disposed between indentations of adjacent substantially U-shaped members. The width S1 of the inlet 10 and the outlet 11 is smaller than the width T1 of the air inlet 24 and is disposed to avoid contact with the air inlet 24 and the substantially U-shaped member 25. Furthermore air injected from the air discharge holes 18 is injected upstream of the main stream 30 of reformate gas.

Since it is possible to form a substantially U-shaped curved passage 8 having a plurality of turns, it is possible to create a uniform mixture of air and reformate gas. The CO oxidizer 1 is made compact by integrating the agitator 4 and the oxidizing agent inlet 5 (air inlet 24) and in particular by making the oxidizing agent inlet 5 a section of the member comprising the curved passage 8.

Figure 18:
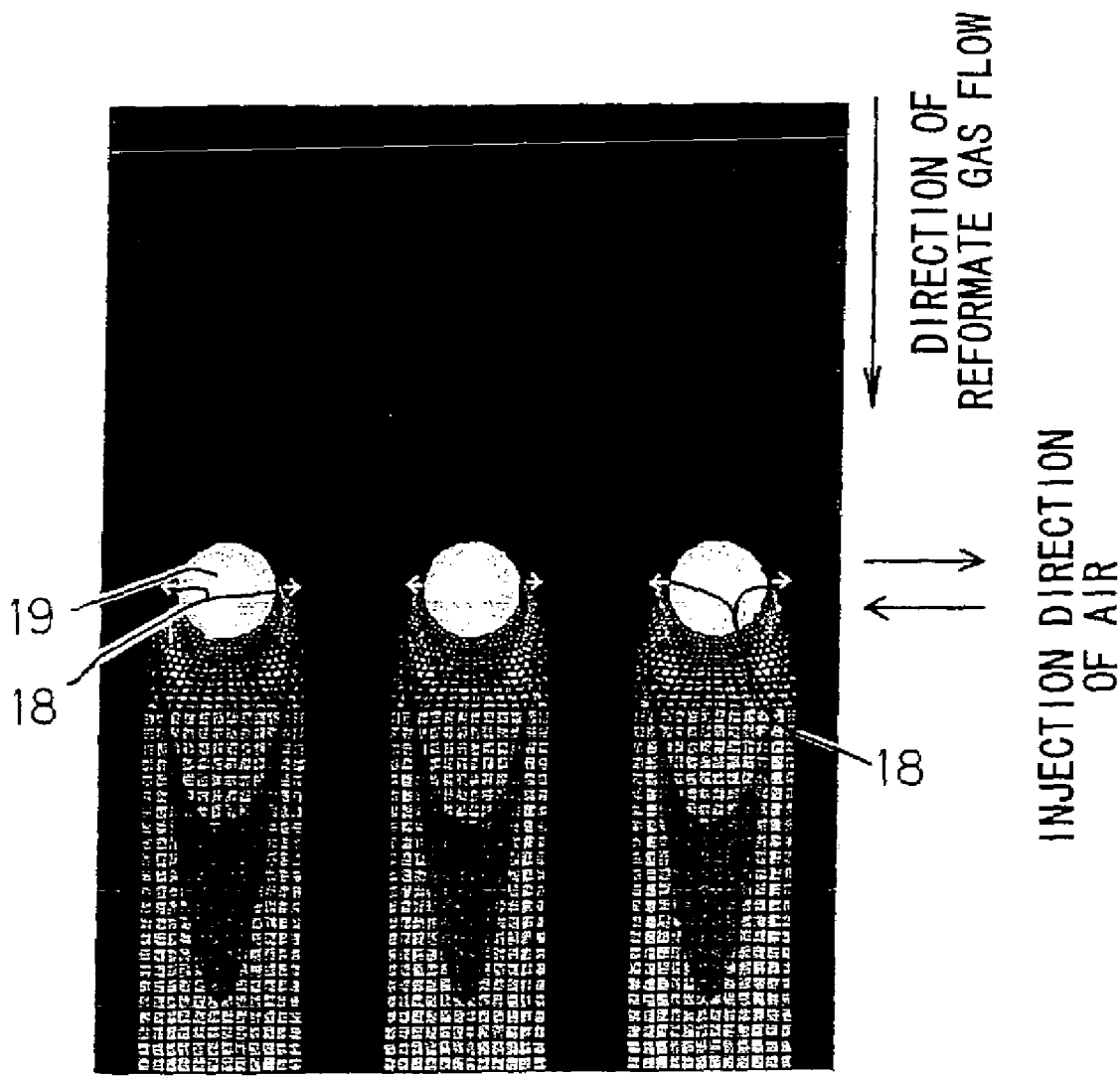
FIG. 18 describes the flow of the mixture of air and gas according to the prior-art technique.
Figure 19:
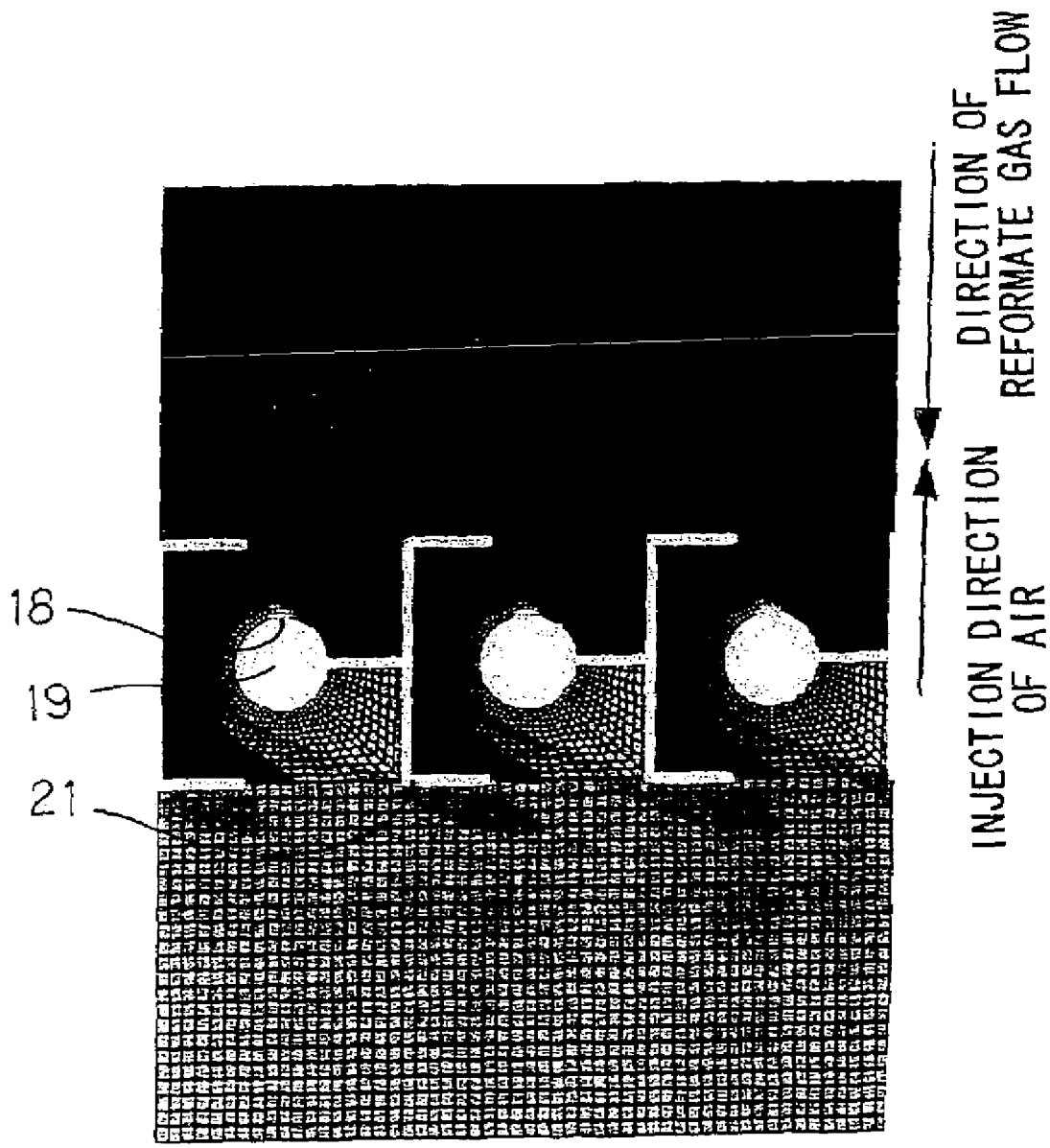
FIG. 19 describes the flow of the mixture of air and gas according to generated by an agitator according to the fifth embodiment.

Lastly referring to FIG. 18 and FIG. 19, the result of simulations of mixing air and reformate gas will be described. FIG. 18 shows the flow of the mixture of reformate gas and air when air is supplied by the conventional air inlet in a cylindrical shape. In FIG. 18, the air injection holes 18 are formed on the crosswise sides of the air inlet and air is injected crosswise to the main stream of reformate gas as indicated by the arrows. On the other hand, in FIG. 19, the flow of the mixture of reformate gas and air is shown when reformate gas and air are mixed by an agitator 4 according to a fifth embodiment of this invention. In FIG. 19, air is uniformly mixed over the entire passage in contrast to the situation shown in FIG. 18 where air and reformate gas encounter difficulty mixing between the air inlets.

The weight of the agitator 4 is reduced when the members of the agitator 4 used in the above embodiments are made from a porous material. Furthermore although the agitator 4 and the oxidizing agent inlet are disposed in the CO oxidizer 1 in the above embodiments, it is possible to position these components outside of the CO oxidizer 1 as long as they are positioned upstream of the CO removing catalyst 6.

The entire contents of Japanese Patent Application P2002-88037 (filed Mar. 27, 2002) are incorporated herein by reference.

Modifications and variations of the embodiments described above will occur to those skilled in the art, in light of the above teachings. The scope of the invention is defined with reference to the following claims.

What is claimed is:

1. A carbon monoxide (CO) oxidizer connected to a reformer performing reformate reactions to produce a reformate gas containing hydrogen and carbon monoxide, the CO oxidizer having a catalyst for promoting oxidation of carbon monoxide to reduce a concentration of carbon monoxide in the reformate gas produced by the reformer, the CO oxidizer comprising:

a main passage allowing flow of reformate gas supplied from the reformer to an agitator;

a plurality of inlets disposed upstream of the catalyst and supplying oxidizing agent to the reformate gas; and the agitator for agitating the reformate gas from the main passage, the agitator comprising at least three members for impeding a main stream of reformate gas flowing through the main passage, adjacent members of said at least three members being disposed so that their cross sections projected in the direction of the main stream partially overlap and so that their cross sections projected in the direction perpendicular to the main stream flowing in the main passage partially overlap, wherein a plurality of curved passages having at least two curves are formed downstream of the inlet and between said at least three members, and wherein said at least three members are disposed substantially in a row which is substantially perpendicular to a direction of the main stream;

wherein the agitator divides the main stream flowing through the main passage into a plurality of substreams flowing through the curved passages, wherein the number of inlets is equal to the number of curved passages, and one inlet is disposed in each curved passage in the agitator so as to supply oxidizing agent for each curved passage and, and wherein one or more of said at least three members comprises:

a substantially U-shaped member in cross section which has a lateral plate, and an upper plate and a lower plate extending in a substantially perpendicular direction from the lateral plate, the lateral plate being parallel to the direction of the main stream, and a perpendicular section extending from the lateral plate of the substantially U-shaped member.

2. A carbon monoxide (CO) oxidizer connected to a reformer performing reformate reactions to produce a reformate gas containing hydrogen and carbon monoxide, the CO oxidizer having a catalyst for promoting oxidation of carbon monoxide to reduce a concentration of carbon monoxide in the reformate gas produced by the reformer, the CO oxidizer comprising:

a main passage allowing flow of reformate gas supplied from the reformer to an agitator;

a plurality of inlets disposed upstream of the catalyst and supplying oxidizing agent to the reformate gas; and the agitator for agitating the reformate gas from the main passage, the agitator comprising at least three members for impeding a main stream of reformate gas flowing through the main passage, adjacent members of said at least three members being disposed so that their cross sections projected in the direction of the main stream partially overlap and so that their cross sections projected in the direction perpendicular to the main stream flowing in the main passage partially overlap, wherein a plurality of curved passages having at least two curves are formed downstream of the inlet and between said at least three members, and wherein said at least three members are disposed substantially in a row which is substantially perpendicular to a direction of the main stream;

wherein the agitator divides the main stream flowing through the main passage into a plurality of substreams flowing through the curved passages, wherein the number of inlets is equal to the number of curved passages, and one inlet is disposed in each curved passage in the agitator so as to supply oxidizing agent for each curved passage, and wherein said at least three members comprise:

two opposed members with a substantially U-shaped cross section, each of said two opposed members having a lateral plate, and an upper plate and a lower plate extending in a substantially perpendicular direction from the lateral plate, and one member having the inlet for supplying oxidizing agent, wherein said one member is disposed between said two opposed members.

3. A carbon monoxide (CO) oxidizer connected to a reformer performing reformate reactions to produce a reformate gas containing hydrogen and carbon monoxide, the CO oxidizer having a catalyst for promoting oxidation of carbon monoxide to reduce a concentration of carbon monoxide in the reformate gas produced by the reformer, the CO oxidizer comprising:

a main passage allowing flow of reformate gas supplied from the reformer to an agitator;

a plurality of inlets disposed upstream of the catalyst and supplying oxidizing agent to the reformate gas; and the agitator for agitating the reformate gas from the main passage, the agitator comprising at least three members for impeding a main stream of reformate gas flowing through the main passage, adjacent members of said at least three members being disposed so that their cross sections projected in the direction of the main stream partially overlap and so that their cross sections projected in the direction perpendicular to the main stream flowing in the main passage partially overlap, wherein a plurality of curved passages having at least two curves are formed downstream of the inlet and between said at least three members, and wherein said at least three members are disposed substantially in a row which is substantially perpendicular to a direction of the main stream;

wherein the agitator divides the main stream flowing through the main passage into a plurality of substreams flowing through the curved passages, wherein the number of inlets is equal to the number of curved passages, and one inlet is disposed in each curved passage in the agitator so as to supply oxidizing agent for each curved passage, and wherein said at least three members are substantially U-shaped members each having a lateral plate, and an upper plate and a lower plate extending in a substantially perpendicular direction from the lateral plate, wherein the lateral plate is disposed substantially perpendicular to the main stream.

4. A carbon monoxide (CO) oxidizer connected to a reformer performing reformate reactions to produce a reformate gas containing hydrogen and carbon monoxide, the CO oxidizer having a catalyst for promoting oxidation of carbon monoxide to reduce a concentration of carbon monoxide in the reformate gas produced by the reformer, the CO oxidizer comprising:

a main passage allowing flow of reformate gas supplied from the reformer to an agitator;

a plurality of inlets disposed upstream of the catalyst and supplying oxidizing agent to the reformate gas; and the agitator for agitating the reformate gas from the main passage, the agitator comprising at least three members for impeding a main stream of reformate gas flowing through the main passage, adjacent members of said at least three members being disposed so that their cross sections projected in the direction of the main stream partially overlap and so that their cross sections projected in the direction perpendicular to the main stream flowing in the main passage partially overlap, wherein a plurality of curved passages having at least two curves are formed downstream of the inlet and between said at least three members, and wherein said at least three members are disposed substantially in a row which is substantially perpendicular to a direction of the main stream;

wherein the agitator divides the main stream flowing through the main passage into a plurality of substreams flowing through the curved passages, wherein the number of inlets is equal to the number of curved passages, and one inlet is disposed in each curved passage in the agitator so as to supply oxidizing agent for each curved passage, and wherein one or more of said at least three members is a substantially H-shaped member having a lateral plate, and an upper plate and a lower plate extending in a substantially perpendicular direction from the lateral plate, the lateral plate being parallel to the direction of the main stream.

* * * * *